(12) United States Patent
Mizuno

(10) Patent No.: US 11,546,488 B2
(45) Date of Patent: Jan. 3, 2023

(54) SCANNER, SCANNER CONTROL METHOD, AND STORAGE MEDIUM

(71) Applicant: CANON KABUSHIKI KAISHA, Tokyo (JP)

(72) Inventor: Takafumi Mizuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/194,754

(22) Filed: Mar. 8, 2021

(65) Prior Publication Data
US 2021/0289103 A1     Sep. 16, 2021

(30) Foreign Application Priority Data
Mar. 10, 2020 (JP) .............................. JP2020-041056

(51) Int. Cl.
*H04N 1/44* (2006.01)

(52) U.S. Cl.
CPC ........... *H04N 1/444* (2013.01); *H04N 1/4426* (2013.01); *H04N 2201/0094* (2013.01)

(58) Field of Classification Search
USPC ........... 358/1.1–3.29, 1.11–1.18; 399/75–83; 715/733–751; 725/1–31
See application file for complete search history.

(56) References Cited

U.S. PATENT DOCUMENTS

| | | | |
|---|---|---|---|
| 2009/0024931 A1* | 1/2009 | Bae | G06F 16/176 715/748 |
| 2010/0149570 A1* | 6/2010 | Kamiya | G06F 21/608 358/1.13 |
| 2015/0103383 A1* | 4/2015 | Dowling | H04N 1/00225 358/402 |
| 2015/0248560 A1 | 9/2015 | Pathak | |
| 2021/0127035 A1* | 4/2021 | Kim | H04L 63/107 |

FOREIGN PATENT DOCUMENTS

| | | | | |
|---|---|---|---|---|
| JP | 2008288686 | * | 11/2008 | ............. H04N 1/387 |
| JP | 2012029076 | * | 2/2012 | ............. H04N 1/00 |
| JP | 2015165382 A | | 9/2015 | |

* cited by examiner

*Primary Examiner* — Marcellus J Augustin
(74) *Attorney, Agent, or Firm* — Rossi, Kimms & McDowell LLP

(57) ABSTRACT

In a Multi-Function Peripheral (MFP), identification information readable from an IC card is accepted, an administrator ID and an administrator password are used to access a policy server, a policy is registered in the policy server based on the accepted identification information, and storage of an encrypted file including image data obtained by a scan is controlled. A security setting in accordance with the policy based on the identification information is associated with the encrypted file, and a restriction of at least a part of an operation on the file is enabled in accordance with the security setting in accordance with the policy.

16 Claims, 20 Drawing Sheets

FIG. 3A

User management table — 400

| User ID | User name | Password | Role |
|---|---|---|---|
| Administrator | Administrator | ebdgh | Administrator |
| xyzz1234 | mfp_user11 | Bbgdut@9 | General user |
| xqz853bec | mfp_user12 | irTcM%@99K | General user |
| uy73491xxy | mfp_user13 | pw@857re | General user |
| ⋮ | | | |

FIG. 3B

Group management table — 410

| Group ID | Group name | Belonging user ID list |
|---|---|---|
| G_xyzz1234 | mfp_group21 | xyzz1234,uy73491xxy |
| G_xqz853bec | mfp_group22 | xqz853bec |
| ⋮ | | |

FIG. 3C

Policy management table — 420

| Policy ID | Policy name | Restriction list |
|---|---|---|
| P_0052 | View only permitted | ● |
| P_0053 | Group edition not permitted | ● |
| P_0062 | Print and view expiration term (1 week) | ● |
| ⋮ | | |

Authority — 425

| Target | Print | View | Edition | Expiration term |
|---|---|---|---|---|
| G_xyzz1234 | × | ○ | × | — |

426

| Target | Print | View | Edition | Expiration term |
|---|---|---|---|---|
| xyzz1234 | ○ | ○ | ○ | — |
| G_xqz853bec | ○ | ○ | × | — |

427

| Target | Print | View | Edition | Expiration term |
|---|---|---|---|---|
| G_xyzz1234 | ○ | ○ | × | 7days |

FIG. 3D

Document management table — 430

| Document ID | Applied policy ID | Encryption key |
|---|---|---|
| D_2031 | P_00062 | bz37 |
| D_2847 | P_00053 | 88d3 |
| D_3001 | P_00053 | Y4%x |

FIG. 4

600 — Policy server setting

| | |
|---|---|
| Address | ▭ —601 |
| Administrator ID | ▭ —602 |
| Administrator password | ▭ —603 |
| User ID generation key | ▭ —604 |
| Password generation key | ▭ —605 |

[ OK ] [ Back ]

Policy server setting table —1500

| | | |
|---|---|---|
| Address | 198.168.10.38 | —1501 |
| Administrator ID | Administrator | —1502 |
| Administrator password | ebdgh | —1503 |
| User ID generation key | a$di%**@9J | —1504 |
| Password generation key | 1@PrQ#+ttX | —1505 |

FIG. 9

INITIAL STATE

User management table —1000

| User ID | User name | Password | Role |
|---|---|---|---|
| Administrator | Administrator | ebdgh | Administrator |

Group management table —1010

| User ID | User name | Belonging user ID list |
|---|---|---|

Policy management table —1020

| Policy ID | Policy name | Restriction list |
|---|---|---|
| P_0002 | Base_Print and view permission | ● |
| P_00012 | Base_View expiration term (1 week) | ● |

Restriction list / Authority

| Target | Print | View | Edition | Expiration term |
|---|---|---|---|---|
| User : Administrator | ○ | ○ | × | — |

| Target | Print | View | Edition | Expiration term |
|---|---|---|---|---|
| User : Administrator | × | ○ | × | 7days |

Document management table —1030

| Document ID | Applied policy ID | Encryption key |
|---|---|---|

FIG. 10

NEW GROUP ADDITION (INCLUDING USER ADDITION)

User management table —1100

| User ID | User name | Password | Role |
|---|---|---|---|
| Administrator | Administrator | ebdgh | Administrator |
| acdg0357 | mfp_user1 | Ec9#edx | General user |

Group management table —1110

| User ID | User name | Belonging user ID list |
|---|---|---|
| G004 | mfp_group1 | acdg0357 |

Policy management table —1120

| Policy ID | Policy name | Restriction list |
|---|---|---|
| P_0002 | Base_Print and view permission | ● |
| P_00012 | Base_View expiration term (one week) | ● |
| P_00013 | G_acdg0357_Print and view permission | ● |
| P_00014 | G_acdg0357_View expiration term (one week)view permission | ● |

Restriction list / Authority

| Target | Print | View | Edition | Expiration term |
|---|---|---|---|---|
| User : Administrator | ○ | ○ | × | — |

| Target | Print | View | Edition | Expiration term |
|---|---|---|---|---|
| User : Administrator | × | ○ | × | 7days |

1121

| Target | Print | View | Edition | Expiration term |
|---|---|---|---|---|
| Group : G004 | ○ | ○ | × | — |

1122

| Target | Print | View | Edition | Expiration term |
|---|---|---|---|---|
| Group : G004 | × | ○ | × | 7days |

Document management table —1130

| Document ID | Applied policy ID | Encryption key |
|---|---|---|
| D_1031 | P_00012 | K3dg |

FIG. 14A

Policy server generation — 1600

| Address | |
| Administrator ID | |
| Administrator password | |
| User ID generation key | |
| Password generation key | |
| non-use user deletion days | | — 1601

OK  Back

Policy server setting table — 1610

| | |
|---|---|
| Address | 198.168.10.38 |
| Administrator ID | Administrator |
| Administrator password | ebdgh |
| User ID generation key | a$di%**@9J |
| Password generation key | 1@PrQ#+ttX |
| non-use user deletion days | 60 |

— 1611

FIG. 14B user management table — 1800

1801

| User ID | User name | Password | Role | Last access date and time |
|---|---|---|---|---|
| Administrator | Administrator | ebdgh | Administrator | 2019/08/21 13:59 |
| xyzz1234 | mfp_user11 | Bbgdut@9 | General user | 2019/07/04 21:12 |
| xqz853bec | mfp_user12 | irTcM%@99K | General user | 2019/09/01 07:55 |
| uy73491xxy | mfp_user13 | pw@857re | General user | 2019/08/31 17:42 |
| ⋮ | | | | |

FIG. 16

POLICY SELECTION WINDOW 19000

Please select a policy.

○ Permit only view
○ Permit print and view (expiration term: 1 week)
○ Permit print and view (expiration term: 1 month)
○ Permit print and view

[create original policy] 19001

[OK] [Back]

ACCESS RIGHT SETTING WINDOW 19100

Please select access right.

19102 — ☐ Print permission
☐ View permission
☐ Expiration term
_____ days

[Select existing policy] 19101

[OK] [Back]

SCANNER, SCANNER CONTROL METHOD, AND STORAGE MEDIUM

BACKGROUND OF THE INVENTION

Field of the Invention

The present invention relates to a scanner, a scanner control method, and a storage medium.

Description of the Related Art

In recent years, shared offices, co-working spaces, or the like in which an office floor is shared and used not only by members of a single company, section, or family but also by people from various types of business have increased as an office environment.

In a shared office or a co-working space, a shared Multi-Function Peripheral (MFP) or the like that can be used by users are often installed in a shared space by a shared office provider or a co-working space provider.

In such an environment, an MFP or the like are used by an unspecified number of users, and when a manuscript is scanned and a document is stored in a movable medium such as a USB memory, the movable medium may be used in an unauthorized manner if the movable medium is lost or the like. Further, when a document is stored in an external storage such as a cloud storage besides a movable medium, information leakage due to unauthorized access may occur in an environment used by an unspecified number of persons. Further, when an MFP or the like are installed in a shared space such as a lobby, there is a concern in terms of security.

To enhance the security of a scanned document, there is a method of providing a policy to a scanned document to perform access control. Japanese Patent Application Laid-Open No. 2015-165382 proposes a technology in which an operator of a scanner specifies a user and provides a policy to a document generated by an MFP.

However, although security can be enhanced when a shared office provider prepares a membership-dedicated space and installs a single MFP or the like provided with such a policy (for dedicated use) for each room, cost for installing the MFP or the like will increase at the provider. Thus, the usage charge will be high, and the cost charged to shared office users may increase.

Further, to install an MFP or the like to which a shared office provider can provide a policy, it is required to prepare an external policy server and set up the MFP or the like and the policy server, and this is time consuming. Furthermore, in the MFP or the like placed in a shared office and used by an unspecified number of persons, it is difficult to specify a user and provide a policy to a document.

The present invention has been made to solve the problems described above. The present invention intends to provide a mechanism that makes it possible to provide a policy to a scanned document to enhance security with a simple operation and, even when a document provided with a policy is used, confirm the policy to enable only an authorized operation with a simple operation.

SUMMARY OF THE INVENTION

According to an aspect of the present invention, a scanner comprises: a management unit that manages predetermined account information registered in a policy server shared by a plurality of users; an acceptance unit that accepts identification information readable from a mobile device possessed by a user; an access unit that accesses the policy server by using the predetermined account information; a registration unit that registers a policy in the policy server based on the accepted identification information; and a control unit that controls storage of an encrypted file including image data obtained by a scan, wherein a security setting in accordance with the policy based on the identification information is associated with the encrypted file, and wherein a restriction of at least a part of an operation on the file is enabled in accordance with the security setting in accordance with the policy.

Further features of the present invention will become apparent from the following description of exemplary embodiments with reference to the attached drawings.

BRIEF DESCRIPTION OF THE DRAWINGS

FIG. 3A is a diagram illustrating an example of a user management table held by a policy server.

FIG. 3B is a diagram illustrating an example of a group management table held by the policy server.

FIG. 3C is a diagram illustrating an example of a policy management table held by the policy server.

FIG. 3D is a diagram illustrating an example of a document management table held by the policy server.

FIG. 4 is a diagram illustrating policy server setting.

FIG. 9 is a diagram illustrating a management table held by the policy server.

FIG. 10 is a diagram illustrating a management table held by the policy server.

FIG. 14A is a diagram illustrating a policy setting of a second embodiment.

FIG. 14B is a diagram illustrating a user management table of the second embodiment.

FIG. 16 is a diagram illustrating a policy selection window of a third embodiment.

DESCRIPTION OF THE EMBODIMENTS

Embodiments for implementing the present invention will be described below with reference to the drawings.

First Embodiment

Figure 1:
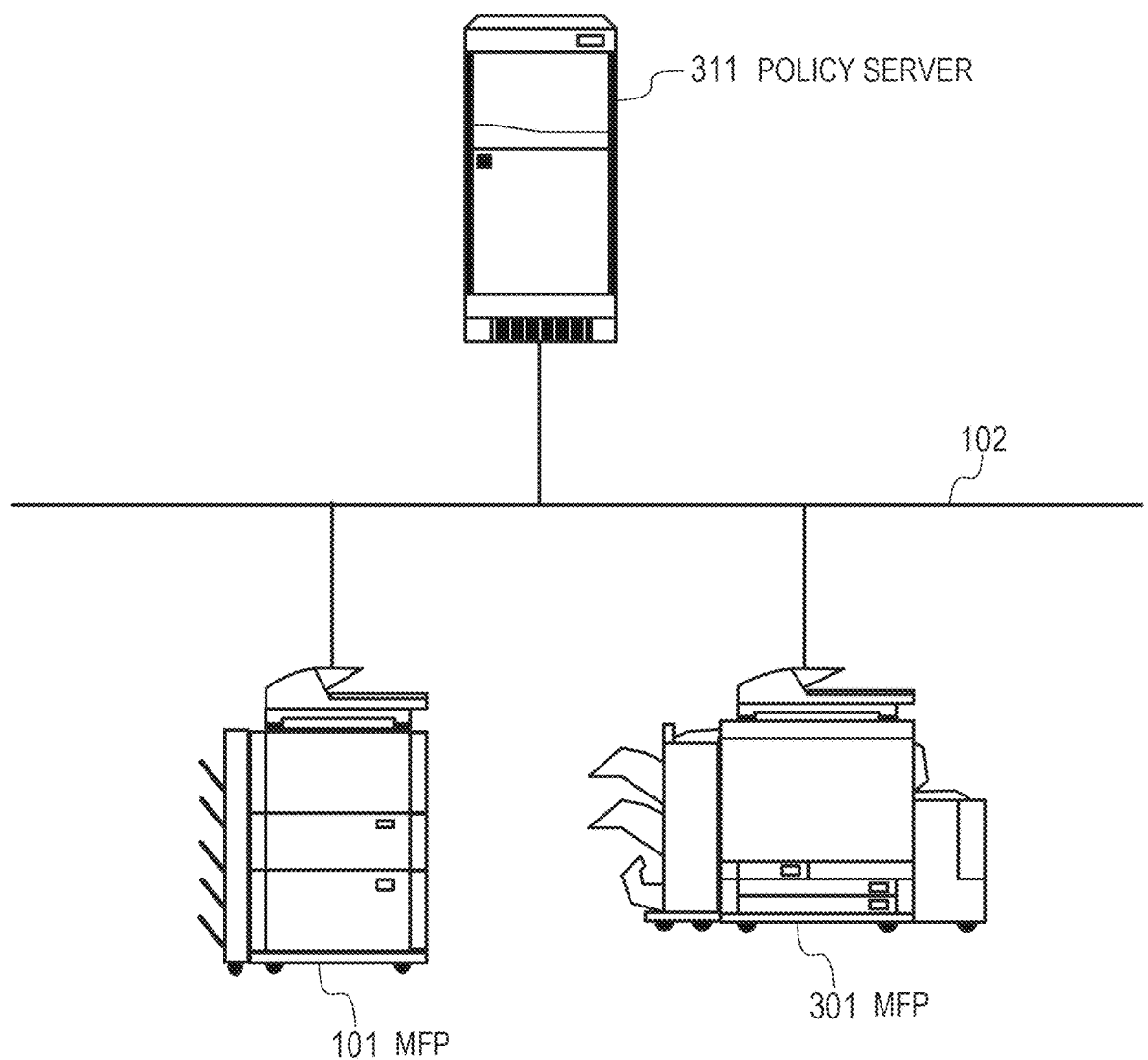
FIG. 1 is a configuration diagram of a system illustrating one embodiment of the present invention.

FIG. 1 is a diagram illustrating an example of the configuration of a system to which an image reading apparatus (scanner) can be applied illustrating one embodiment of the present invention.

As illustrated in FIG. 1, in the system of the present embodiment, Multi-Function Peripherals (MFPs) 101 and 301 and a policy server 311 are connected in a communicative manner via a network 102. The MFP 101 or 301 or the policy server 311 is able to access each other by using unique identifiable values such as IP addresses on a network. Note that, although the number of MFPs connected to the policy server 311 is two in the example illustrated in FIG. 1, the number of connected MFPs is not limited, and may be one or may be three or greater.

The user sets, for the policy server 311, access authority or an expiration term as to what operation (printing, viewing, edition, or the like) is allowed on a user or group basis as a policy for a document file such as image data file or the like generated by the MFP 101 or the like. Accordingly, when an operation is performed on such a document file, the user who intends to perform the operation is able to confirm to the policy server 311 whether or not a desired operation is authorized for the document file and perform the desired operation only when the desired operation is authorized.

Note that confirmation to the policy server 311 is similarly performed when not only an MFP but also other information processing devices such as a printer, a personal computer (PC), a smartphone, or the like are connected to the network 102 and these devices perform an operation on the document file. Further, although description is provided as the client being the MFP 101 in the present embodiment, the same applies to a case where the client is the MFP 301 or other client apparatuses such as a scanner, a device described above, or the like.

Figure 2A:
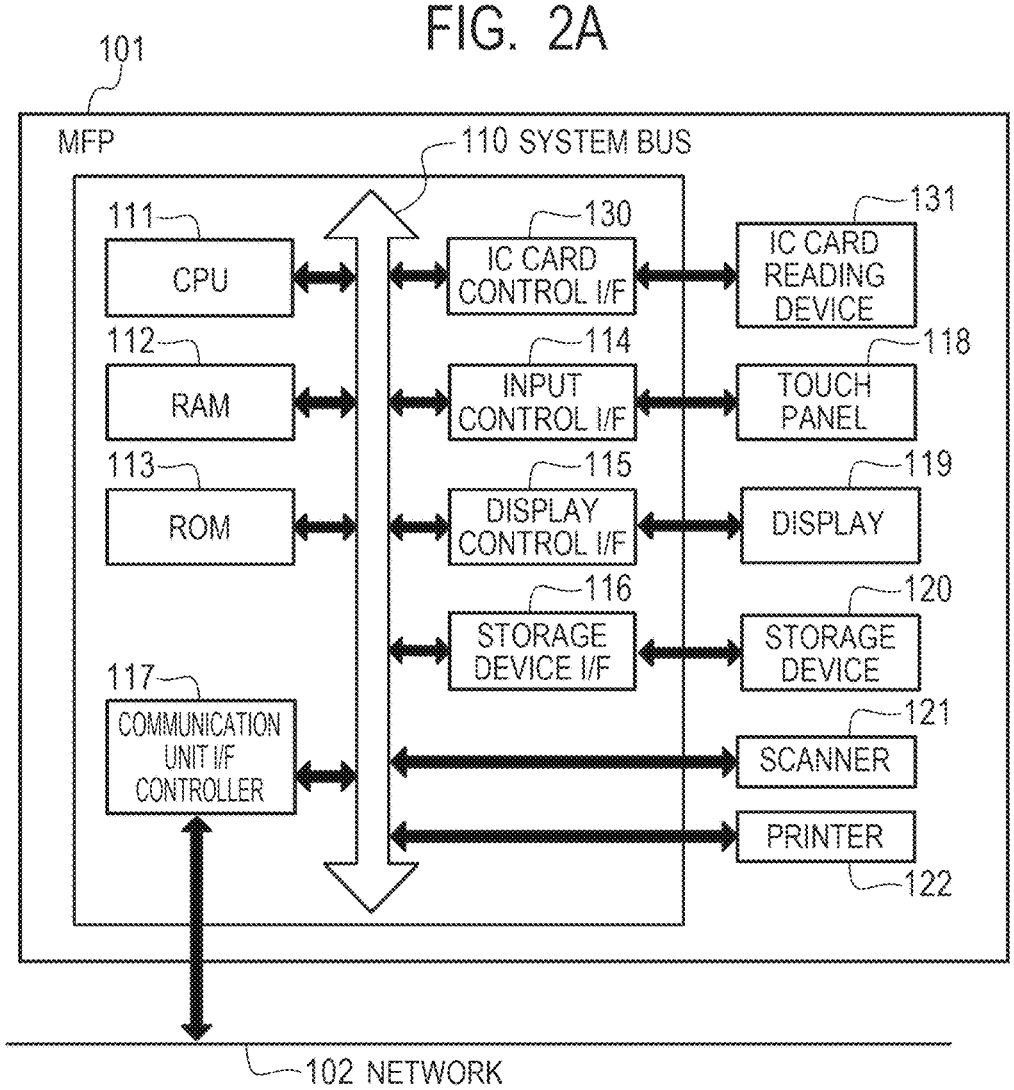
FIG. 2A is a diagram illustrating a hardware configuration of an MFP.

FIG. 2A is a diagram illustrating an example of a hardware configuration of the MFP 101. Note that FIG. 2A illustrates an example for description in the present embodiment, and it goes without saying that the embodiment may include another component or may take another configuration as long as it is a configuration having the same advantageous effect as the present embodiment.

A central processing unit (CPU) 111, a random access memory (RAM) 112, a read only memory (ROM) 113, an input control I/F 114, a display control I/F 115, a storage device I/F 116, and a communication I/F controller 117 are connected to the system bus 110. Further, a scanner 121 and a printer 122 are connected to the system bus 110. Each component connected to the system bus 110 is configured to be able to transfer data with each other via the system bus 110.

The CPU 111 is a device that performs control of each device or calculation and processing of data. The RAM 112 is a volatile memory and is used as main memory of the CPU 111 or a temporary storage region such as a work area. The ROM 113 is a nonvolatile memory, and image data or another data, various programs for operation of the CPU 111, and the like are stored in respective predetermined regions. The CPU 111 controls each component of the MFP 101 by using the RAM 112 as a work memory in accordance with a program stored in the ROM 113, for example. Note that the program for operation of the CPU 111 may be stored in the storage device 120 without being limited to be stored in the ROM 113.

The input control I/F 114 accepts a user operation from the input device, generates a control signal in accordance with the operation, and supplies the control signal to the CPU 111. For example, the input control I/F 114 is connected to a text information input device such as a keyboard (not illustrated), a hard key used for directly inputting a numerical value or the like, a pointing device such as a touch panel 118, or the like as an input device that accepts a user operation. Note that the touch panel 118 is an input device configured such that coordinate information corresponding to a position contacted to a planar-shaped input part is output, for example. In the following, although the present embodiment is described with the operation on a touch panel, it goes without saying that the embodiment is not limited thereto. The CPU 111 controls each component of the MFP 101 in accordance with a program based on a control signal generated and supplied by the input control I/F 114 in accordance with a user operation performed on the input device. This enables the MFP 101 to perform an operation in accordance with the user operation.

The display control I/F 115 outputs a display signal used for displaying an image to the display 119. For example, the CPU 111 supplies the generated display control signal to the display control I/F 115 in accordance to a program. The display control I/F 115 generates a display signal based on this display control signal and outputs the display signal to the display 119. For example, the display control I/F 115 causes the display 119 to display a Graphical User Interface (GUI) screen forming a GUI based on a display control signal generated by the CPU 111.

Further, the touch panel 118 may be formed integrally with the display 119. For example, the touch panel 118 is configured such that light transmissivity does not prevent display on the display 119 and attached on the upper layer of a display face of the display 119. Further, input coordinates on the touch panel 118 and display coordinates on the display 119 are associated with each other. Thereby, a GUI that operates as if a user is able to directly operate a screen displayed on the display 119 can be configured.

The storage device 120 such as a hard disk drive (HDD), a flash memory, or the like is connected to the storage device I/F 116, for example. Data is read from the storage device 120 or data is written to the storage device 120 under the control of the CPU 111. The storage device 120 may be used instead of the RAM 112 or the ROM 113.

The communication I/F controller 117 communicates with various networks such as a LAN, the Internet, a wired network, a wireless network, or the like, for example, under the control of the CPU 111. Various apparatuses such as a PC, another MFP, a scanner, a printer, a server, or the like are connected to the network 102 so as to be able to communicate with the MFP 101. Further, connection to an external authentication server described later is performed via the communication I/F controller 117.

The scanner 121 is an image reading unit that reads a manuscript and generates image data under the control of the CPU 111. For example, the CPU 111 causes the scanner 121 to perform a scan process in accordance with a user instruction input via the input control I/F 114. The scanner 121 reads a manuscript placed on a document glass table or an auto document feeder (ADF), digitalizes data, and generates image data. The scanner 121 then stores the generated image data in the storage device 120 via the storage device I/F 116.

The printer 122 is a printing unit that performs a print process on image data stored in the storage device 120 under the control of the CPU 111. For example, the CPU 111 causes the printer 122 to perform a print process in accordance with a user instruction input via the input control I/F 114 or a command instruction input from an external device via the communication I/F controller 117. The printer 122 reads image data from the storage device 120, converts the image data into a data format in which printing can be performed, and performs printing on a paper document.

An IC card control I/F 130 outputs an IC card reading instruction signal to an IC card reading device 131. Herein, the IC card in the present embodiment refers to a contactless IC card on which Near Field Communication (NFC) or the like are mounted. For example, the CPU 111 supplies the generated IC card control signal to the IC card control I/F 130 in accordance with a program. The IC card control I/F 130 generates an IC card reading signal based on this control signal and outputs the IC card reading signal to the IC card reading device 131. The IC card reading device 131 reads information of an IC card held thereover and outputs a signal that is a read result to the IC card control I/F 130. While the details will be described later, the IC card reading device 131 functions as an accepting device that accepts an IC card unique ID that can be read from an IC card possessed by a user.

Figure 2B:
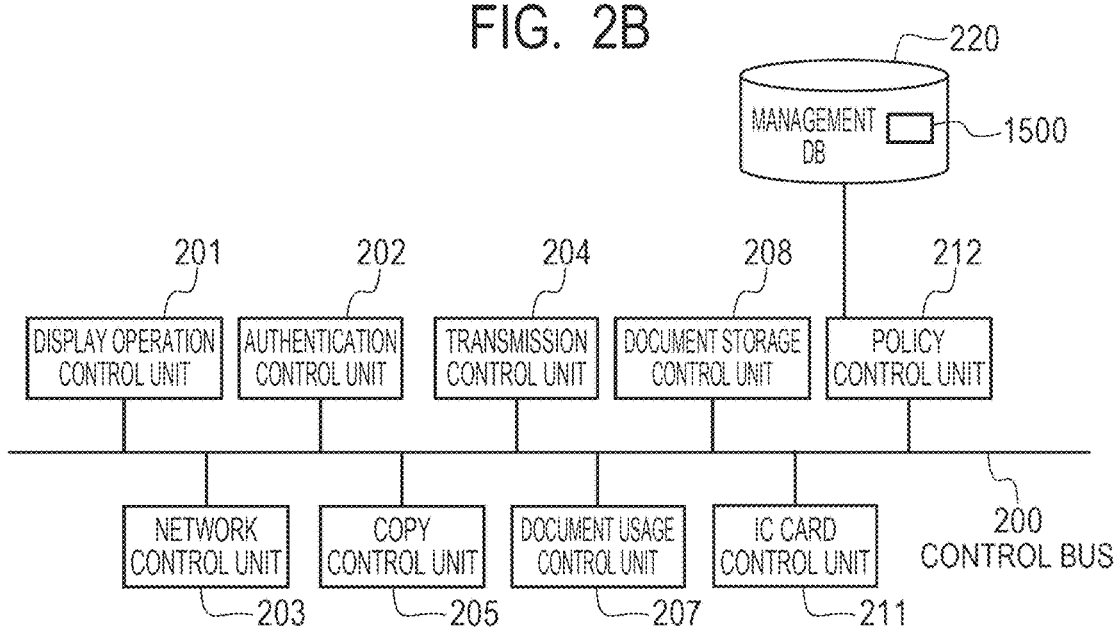
FIG. 2B is a diagram illustrating a software configuration of the MFP.

The software configuration of the MFP 101 will be described with reference to FIG. 2B. FIG. 2B is a diagram illustrating an example of the software configuration of the MFP 101. Note that FIG. 2B illustrates an example for description in the present embodiment, and it goes without saying that the embodiment may include another component or may take another configuration having the same advantageous effect as the present embodiment. Further, the software configuration illustrated in FIG. 2B is implemented to function when the CPU 111 loads a program stored in the ROM 113 into the RAM 112 and executes the program where necessary such as at startup, at a use of a function, or the like.

A control bus 200 is a software bus through which information between respective control units are passed under the control of the CPU 111. For example, the control bus 200 accepts instruction information input by the user from a display operation control unit 201 and temporarily stores the instruction information in the RAM 112. Furthermore, the control bus 200 notifies each control unit that an input instruction has been received.

A network control unit 203 performs a process for establishing a connection to an external device on the network 102 by using the communication I/F controller 117. In the present embodiment, the policy server 311 on the network 102 is accessed.

The display operation control unit 201 controls the input control I/F 114 or the display control I/F 115 under the control of the CPU 111. For example, the display operation control unit 201 performs display on the display 119 via the display control I/F 115 based on an instruction from another control unit. Further, the display operation control unit 201 acquires information input by the user on the touch panel 118 via the input control I/F 114. Note that the display operation control unit 201 notifies each control unit of the acquired information via the control bus 200 where necessary. In the following description, when information or data is passed between control units, the information or data is routed via the control bus 200.

An authentication control unit 202 performs an authentication process for identifying a user and determines whether or not the operator of the MFP 101 is an authorized user of the MFP 101 under the control of the CPU 111. An operation of performing an authentication process and starting a session if the operator is an authorized user is referred to as "login". Further, the authentication control unit 202 controls database storing user information on the storage device 120 (hereafter, referred to as "user information DB"). Note that the authentication control unit 202 may be configured to be connected not only to the user information DB inside the MFP 101 but also to an external authentication server via a communication I/F controller and use an authentication result of the external authentication server. Transfer of authentication information with an external authentication server is performed by using a known technology. Further, the operation of ending a user session after the user finishes using the MFP 101 is referred to as "logout".

Note that the MFP 101 has one or more functions such as copy, scan, and the like (hereafter, referred to as "Function"), and a control unit is provided for each Function. FIG. 2B illustrates a transmission control unit 204, a copy control unit 205, a document usage control unit 207, and a document storage control unit 208 as an example. Obviously, there may be a Function related to a process of the MFP 101 other than the Functions illustrated in FIG. 2B, and there may be a control unit thereof. For example, if the MFP 101 equipped with a FAX is present, a FAX control unit will be present.

The transmission control unit 204 scans a manuscript from the scanner 121 and converts scanned image data or the like (hereafter, referred to as "document") into a predetermined file format. Furthermore, the transmission control unit 204 transmits the document to a mail server or the like on the network 102 via the network control unit 203 by using a protocol such as a mail. The copy control unit 205 scans a manuscript from the scanner 121, performs specified processing such as staple, and performs output to the printer 122.

A document storage control unit 208 scans a manuscript from the scanner 121 and converts the scanned document into a predetermined file format in the same manner as the transmission control unit 204. Furthermore, the document storage control unit 208 stores a document file in a file server on the network 102 via the network control unit 203 by using a communication protocol such as Server Message Block (SMB).

Note that the document storage control unit 208 can store a document not only in a file server but also in the storage device 120 (an HDD, a memory medium such as a USB memory) of the MFP 101 or a storage on the cloud. In the case of the HDD or the memory medium of the MFP 101, the document storage control unit 208 accesses the storage device 120 via the storage device I/F 116 and stores a document. Further, in the case of an external file server or a storage on the cloud, the document storage control unit 208 stores a document in a save location on the network 102 via the network control unit 203 by using a suitable protocol.

A document usage control unit 207 prints a document stored in an external file server, an HDD in the MFP 101, a memory medium, a cloud storage, or the like or performs preview thereof by using the MFP 101. When a document of the HDD of the MFP 101 or the memory medium is used, the document usage control unit 207 accesses the storage device 120 via the storage device I/F 116 and acquires and processes a specified document. In a case of an external file server or a storage on the cloud, the document usage control unit 207 acquires a document from a save location on the network 102 via the network control unit 203 by using a suitable protocol. For example, when printing is performed, an acquired document is output by the printer 122.

The IC card control unit 211 accesses the IC card reading device 131 via the IC card control I/F 130, reads information of an IC card, and returns a read result to a requesting control unit.

The policy control unit 212 communicates with a policy server 311 on the network 102 via the network control unit 203 and performs a process related to a policy such as encryption, decryption, confirmation as to whether or not to perform an operation, or the like of a document in accordance with an instruction from each control unit. Further, the policy control unit 212 communicates with the IC card control unit 211 where necessary and acquires information related to a user on the policy server 311 from the IC card information. Note that the policy control unit 212 acquires information related to the policy server 311 from a management DB 220. The management DB 220 stores information related to a policy server (information such as an address of the policy server 311, a policy server administrator ID, a password, or the like) as a policy server setting. The example of policy server setting is illustrated in FIG. 4 described later.

Mechanism of Document Protection

First, a mechanism for protecting a document file employed in the present embodiment will be described. In the present embodiment, Information Rights Management (IRM) is employed as a mechanism that protects a document file. In the IRM, it is possible to encrypt a document file and restrict printing, viewing, or edition on a user basis. Further, in the management in accordance with the IRM, it is also possible to provide an expiration term and disable access to an expired document file. In the IRM, a mechanism for protecting a document file is realized involving a policy server that centrally manages access restrictions to document files and a client that performs an operation on a document file within the access authority in accordance with a user.

1. Policy Server

FIG. 3A is a diagram illustrating an example of a management table held by the policy server 311. FIG. 3A illustrates a user management table 400. User information on users who use the policy server 311 is stored in the user management table 400.

In the user management table 400, the user ID 401 is a character string used for uniquely identifying a user inside the policy server 311. The user name 402 is a character string representing a name used for making it easier for a person to identify a user. The password 403 is a password used for confirming whether or not the user ID 401 is allowed for use when the policy server 311 is used.

The role 404 is a field for indicating a role in the policy server 311. For example, "Administrator" for managing the policy server 311 and "General user" indicating a user to which a policy is applied are illustrated as an example in the present embodiment. Note that the "Administrator" for managing the policy server 311 refers to a special user assigned to perform management related to a policy, such as managing users or creation of a group, defining a policy content, applying a policy to a specified document, or the like on the policy server 311. Such a user will be denoted below as "policy server administrator". Although only "policy server administrator" and "general user" are illustrated in the present embodiment for simplified illustration, there may be another role.

FIG. 3B illustrates a group management table 410. Information on a group to which a user who uses the policy server 311 belongs is stored in the group management table 410. In the group management table 410, the group ID 411 is a character string for uniquely identifying a group inside the policy server 311. The group name 412 is a character string indicating a name used for making it easier for a person to identify a group. The belonging user ID list 413 indicates which user ID belongs to each group ID. For example, it is indicated that two users of user ID: xyzz1234 and user ID: uy73491 belong to group ID: G_xyzz1234 as belonging users.

FIG. 3C illustrates a policy management table 420. The policy management table 420 stores information on a policy managed by the policy server 311. In the policy management table 420, the policy ID 421 is an ID for uniquely identifying a policy inside the policy server 311. The policy name 422 is a character string for describing a policy content. When a policy is applied, the policy name 422 is a character string used for making it easier for the user to select a policy to be applied, because it is difficult for the user to determine what policy it is from only the policy ID 421.

The restriction list 423 is a list indicating what access restriction is applied. Specifically, the restriction list 423 is formed of a target 424 and authority 425. The target 424 is a user ID or a group ID to which restriction is applied. It is possible to specify what restriction is applied to a plurality of user IDs and group IDs. That is, the user registered in the policy server 311 is associated with a policy via a group ID.

The present embodiment illustrates an example in which information indicating whether or not to permit printing, viewing, or edition to a specified user ID or group ID and expiration term of a file to which the associated policy is applied can be specified as the authority 425.

For example, the restriction list illustrated in 426 as an example is applied to the user xyzz1234 and the group G_xqz853bde. While the user xyzz1234 is permitted for all of printing, viewing, and edition, the group G_xqz853bde is permitted for only printing and viewing and inhibited for edition. Further, for a restriction list illustrated in 427 as an example, the expiration term is seven days, and all access operations are disabled after seven days from the date a policy is applied. Note that the expiration term may be in another form such as a format to directly specify year, month, date and time. The policy server 311 is required to perform processing at an exact date and time and thus connected to a server that can acquire exact time, such as a Network Time Protocol (NTP) server. Note that the restrictions (printing, viewing, edition) described above are an example for illustration, and another restriction may be present, or some of these restrictions may be absent.

FIG. 3D illustrates a document management table 430. In the document management table 430, a list of documents managed by the policy server 311 is recorded. In the document management table 430, the document ID 431 identifies a document and thus is a unique ID. In the example of FIG. 3D, simple character strings are illustrated for document IDs as an example for the purpose of illustration, and a unique ID such as UUID is used, for example.

The applied policy ID 432 is a policy ID indicating a policy applied to the document. The encryption key 433 is a key used for encrypting or decrypting a document. That is, the encryption key 433 is an encryption key and also a decryption key. Although the encryption scheme is not the essence of the present invention and thus is not described in detail, an encryption scheme such as AES may be used, for example, or another encryption scheme may be used. Note that an encryption key and a decryption key may be respective different keys.

2. Client

A client communicates with the policy server 311 and applies (adds) a policy in order to perform encryption and access restriction on a document file. Further, the client confirms to the policy server 311 as to whether or not the user who intends to use a document file is authorized for an operation on a document file to which a policy is applied and, if authorized, decrypts the document file and causes a desired operation to be performed. Note that, if not authorized, the client inhibits the operation on the document file.

Note that the function of the client can be implemented when a computer or a smartphone performs an application of the computer or the smartphone. Further, the function of the client can be implemented when the MFP 101 or 301 or the like perform an application loaded into an embedded device of the MFP 101 or 301 or the like in the present embodiment. In the present embodiment, the policy control unit 212 corresponds to the function of the client.

FIG. 4 is a diagram illustrating policy server setting performed by the client. A policy server setting window 600 is displayed on the display 119 via the display control I/F 115 by the display operation control unit 201 in response to an instruction from the policy control unit 212 to the display operation control unit 201. Further, the display operation control unit 201 receives information input on the touch panel 118 via the input control I/F 114 and transfers the input information to the policy control unit 212.

In the address 601, an address (information indicating a location) indicating the location of the policy server 311 is set with a URL or the like. In the policy server administrator ID 602, a user that is a policy server administrator who operates the policy server 311 is set. In the policy server administrator password 603, a password of the policy server administrator ID 602 is set. That is, the policy server administrator ID 602 and the policy server administrator password 603 correspond to account information on the policy server administrator.

The user ID generation key 604 and the password generation key 605 will be described later. Information set in these fields 601 to 605 is stored in the management DB 220 of FIG. 2B as a policy server setting table 1500.

The policy server address 601, the policy server administrator ID 602, and the policy server administrator password 603 are associated with and stored in an address 1501, an administrator ID 1502, and an administrator password 1503 of the policy server setting table 1500, respectively. Further, the user ID generation key 604 and the password generation key 605 are associated with and stored in a user ID generation key 1504 and a password generation key 1505, respectively.

Note that the policy server setting illustrated in FIG. 4 is once performed at start of the operation of a policy server by a provider that installs a client (the MFP 101 in this example) in a shared office or the like and provides a service. For example, the policy server setting window 600 is displayed on the display 119 in response to an operation performed by a provider on the touch panel 118 of the MFP 101.

3. Operation Sequence Between Policy Server and Client

Figure 5A:
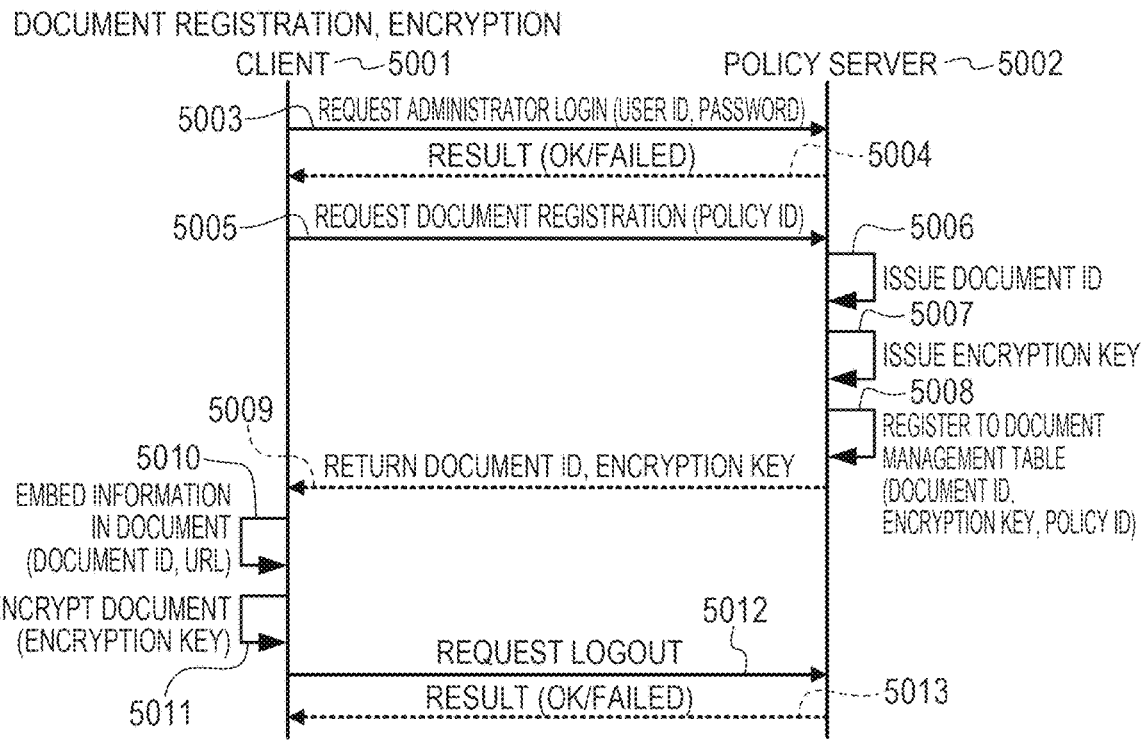
FIG. 5A is a sequence diagram of registration of a document and encryption of a document between the policy server and a client.
Figure 5B:
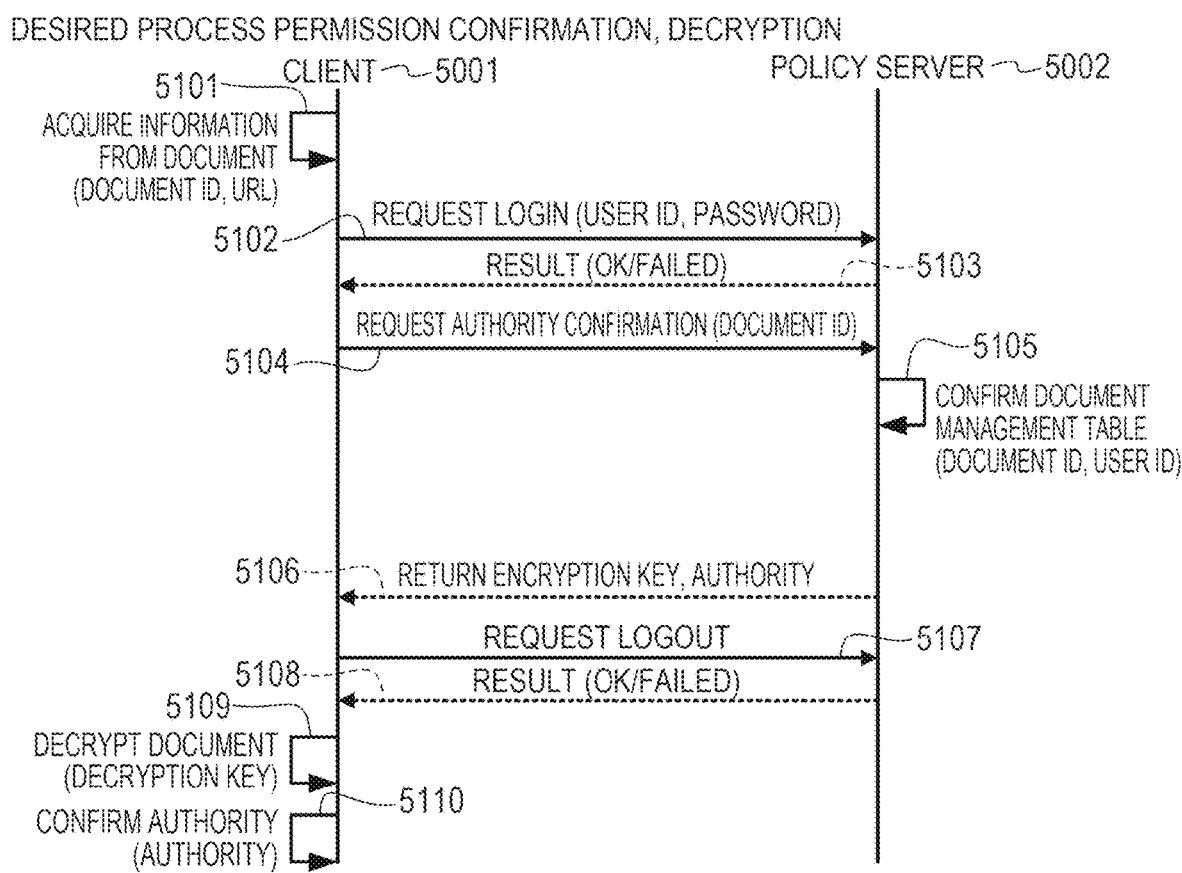
FIG. 5B is a sequence diagram of permission of a desired process and decryption of a document between the policy server and the client.

Sequences of operations between the policy server and the client will be described with reference to FIG. 5A and FIG. 5B. FIG. 5A and FIG. 5B are diagrams illustrating the sequence for operations between the policy server and the client. Note that the operations of FIG. 5A and FIG. 5B are examples for describing the present embodiment, and there may be an operation other than the above. Further, in the sequence, for simplified illustration, the procedure is simplified, for example, a process for an error is omitted.

Further, although description is provided as a client 5001 being the MFP 101 in the present embodiment, the same applies to a case where the client 5001 is the MFP 301 or another client apparatus. Note that, in FIG. 5A and FIG. 5B, the process on the client 5001 side is implemented when the CPU 111 of the MFP 101 reads and executes a program stored in the ROM 113 or the like. Further, a policy server 5002 corresponds to the policy server 311. The process on the policy server 5002 side is implemented when the CPU of one or a plurality of devices forming the policy server 311 reads and executes a program stored in the storage device.

FIG. 5A illustrates an example of a sequence for performing document registration and encrypting a document. Once the user instructs the client 5001 to perform a secure scan, the process of FIG. 5A is started. First, the client 5001 specifies a user ID and a password of a policy server administrator and requests the policy server 5002 for administrator login (5003).

In response to this administrator login request, the policy server 5002 performs administrator login by using the user ID and the password of the policy server administrator. The policy server 5002 then returns whether or not the policy server administrator login is successful (OK) or failed (NG) (5004). If the password is incorrect or the policy server administrator has expired, the login fails, and the process is suspended. In the description of FIG. 5A and FIG. 5B, since a reason for a failure or a process in a case of a failure can be easily assumed also in a sequence for other processes, to simplify the illustration, only the case of successful (OK) will be described below.

In response to receiving a policy server administrator login result (OK in this example), user registration or the like are enabled from the client 5001 to the policy server 5002. Although not illustrated in FIG. 5A, the client 5001 confirms whether or not the user is already registered in the policy server 5002 based on information read from a user's IC card. If not yet registered, the client 5001 performs user registration on the policy server 5002. Furthermore, the client 5001 causes the user to select a policy to be applied from a policy list applicable to the user and reads a manuscript.

Next, the client 5001 specifies a policy ID of the above policy to be applied and requests to the policy server 5002 for a document registration of image data (document) read from the manuscript (5005).

In response to this document registration request, the policy server 5002 issues a document ID (5006). Furthermore, the policy server 5002 issues an encryption key (5007). Further, the policy server 5002 registers the issued document ID and encryption key and specified policy ID in the document management table 430 (5008). Furthermore, the policy server 5002 returns the document ID and the encryption key as issued above to the client 5001 (5009).

In response to receiving the document ID and the encryption key, the client 5001 embeds the document ID returned from the policy server 5002 and the URL of the policy server 5002 in the above document requested for registration (5010). Furthermore, the client 5001 encrypts the document by using the encryption key returned from the policy server 5002 (5011). As described previously, although the description of an encryption scheme will be omitted, an encryption scheme such as AES is used, for example.

Furthermore, the client 5001 requests the policy server 5002 for logout of the policy server administrator (5012). In response to this logout request, the policy server 5002 performs a logout process. The policy server 5002 then returns to a logout result (5013). The client 5001 receives this logout result. Furthermore, although not illustrated in FIG. 5A, the client 5001 stores the encrypted document in a save location specified by the user.

Note that, while the same applies to the following description, it goes without saying that no login process is required when the user has already logged in, and no logout process is required when some process is performed continuously after completion of a desired process.

FIG. 5B illustrates an example of a sequence for confirming permission of a desired process and decrypting a document. Once the user instructs the client 5001 to perform an operation on an encrypted document stored in a SD card or the like, the process of FIG. 5B is started. First, the client 5001 acquires, from a document that the user tries to open, a document ID and the URL of the policy server 5002 embedded in the document (5101).

Furthermore, the client 5001 specifies the user ID and the password of the user who is trying to open the document and requests to the policy server 5002 for login (5102). Although not illustrated in FIG. 5B, the client 5001 generates the user ID and the password described above based on information read from a user's IC card. Note that there is no login of the policy server administrator in this sequence.

In response to the login request of 5102 described above, the policy server 5002 performs login by using the user ID and the password. The policy server 5002 then returns whether or not the login is successful (OK) or failed (NG) (5103).

In response to receiving a login result (OK in this example), the client 5001 specifies the document ID of the document, which the user tries to open, and request the policy server 5002 to confirm authority (5104).

In response to this authority confirmation request, the policy server 5002 acquires the encryption key corresponding to the above specified document ID in the document management table 430 and the authority to the document of the currently logged-in user who has requested login in 5102 described above (5105). If the currently logged-in user belongs to a group and the authority of the group exists, the authority is acquired. In the present embodiment, since the user belongs to only a single group and the authority is set to only a single group in the policy, although multiple pieces of authority are not acquired, a configuration in which multiple pieces of authority are acquired may be employed. When multiple pieces of authority are acquired, a method of calculating a logical sum or a logical product of respective pieces of authority and handling the multiple pieces of authority as collective authority or the like may be used, for example.

Next, the policy server 5002 returns the encryption key of the specified document ID acquired in 5105 described above and the authority of the currently logged-in user to the client 5001 (5106).

The client 5001 that received the encryption key and the user's authority requests the policy server 5002 for logout (5107). In response to this logout request, the policy server 5002 performs a logout process. The policy server 5002 then returns a logout result (5108). The client 5001 receives this logout result.

The client 5001 decrypts the document by using the encryption key returned from the policy server 5002 (5109). Furthermore, the client 5001 compares the authorized operation returned from the policy server 5002 with a desired operation (specified operation) and performs a desired operation (for example, printing, viewing, or the like) on the above decrypted document if permitted as authority (5110). That is, only the operation in accordance with the policy provided to the document can be performed, and execution of the operation against the policy is disabled.

4. Example of Policy Setting

Figure 6A:
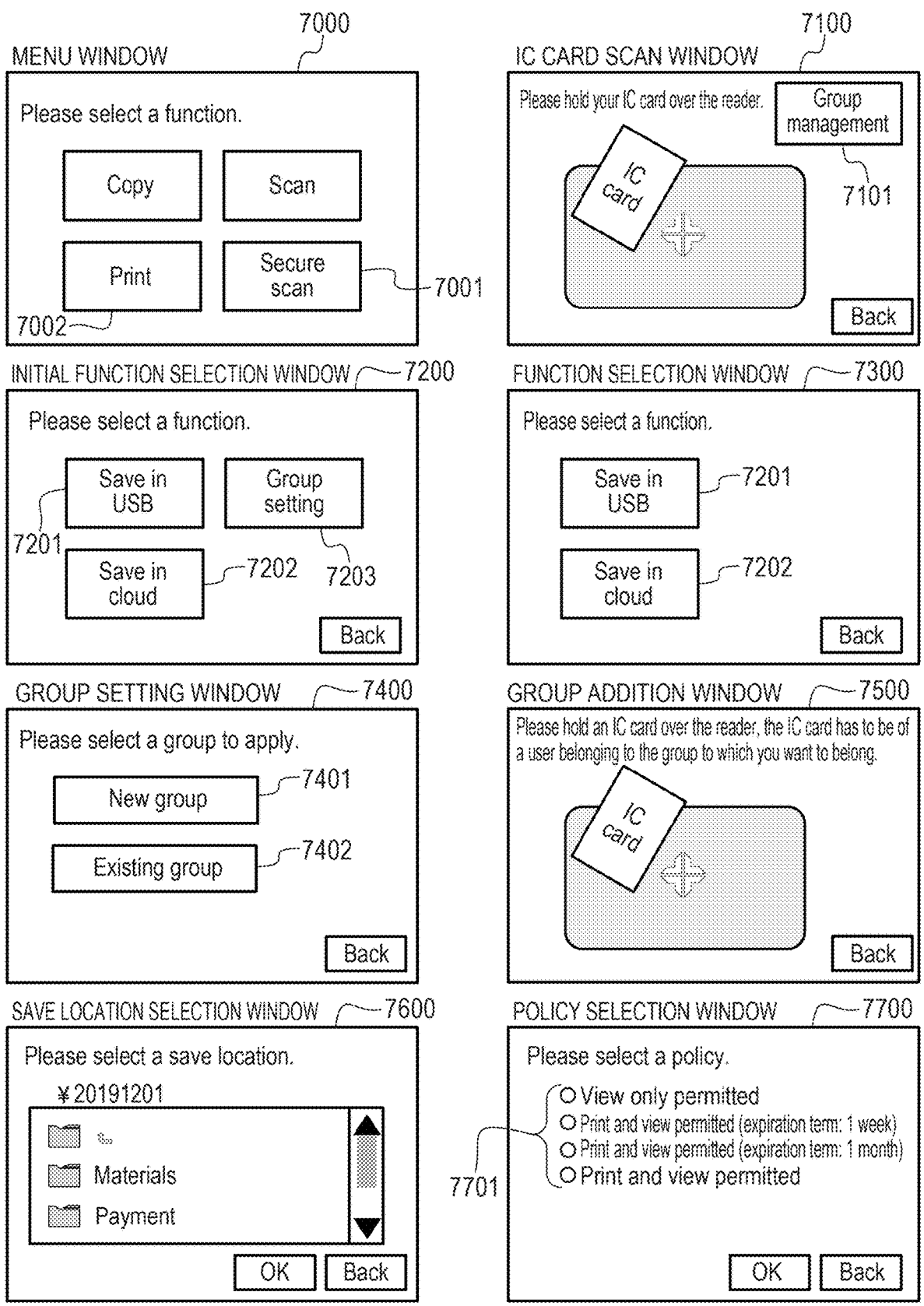
FIG. 6A is a diagram illustrating a secure scan window of the MFP.
Figure 6B:
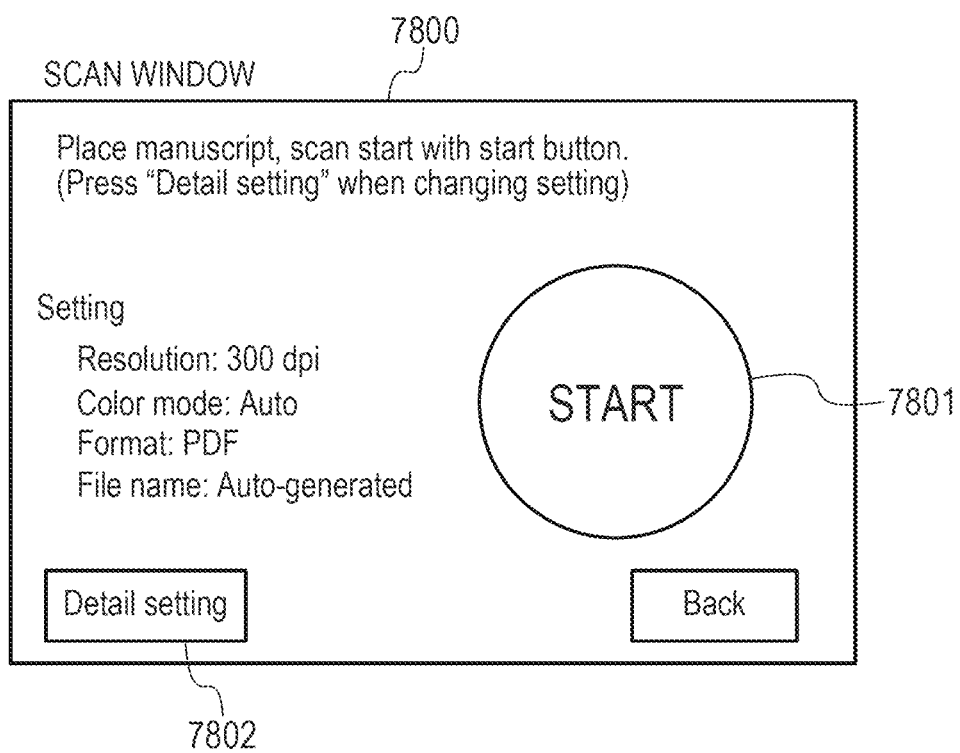
FIG. 6B is a diagram illustrating a secure scan window of the MFP.

The operation to simply set a policy by using an IC card at the MFP 101 in the present embodiment will be described below with reference to FIG. 6A, FIG. 6B, FIG. 9, and FIG. 10. FIG. 6A and FIG. 6B are diagrams illustrating an example of a secure scan window of the MFP 101. Windows illustrated in FIG. 6A and FIG. 6B and in FIG. 7 and FIG. 8 described later are displayed on the display 119 via the display control I/F 115 by the display operation control unit 201 in response to an instruction from the policy control unit 212 to the display operation control unit 201. Further, the display operation control unit 201 receives information input on the touch panel 118 via the input control I/F 114 and transfers the input information to the policy control unit 212. In the following description, the description thereof will be omitted.

FIG. 9 and FIG. 10 are diagrams illustrating an example of management tables held by the policy server 311.

Buttons used for calling operations available in the MFP 101 such as a copy function, a print function, a scan function, a secure scan function, or the like are arranged in a menu window 7000 and can be selected by the user. It goes without saying that another function such as FAX may be able to be selected, for example. The secure scan function will be described below. On the menu window 7000, once the secure scan button 7001 is pressed, the window changes to an IC card scan window 7100.

In the IC card scan window 7100, once the user who intends to perform a secure scan holds an IC card over the IC card reading device 131, the window changes to an initial function selection window 7200 or a function selection window 7300. When the secure scan function is implemented for the first time with the unique ID of the IC card held over by the user, the window changes to the initial function selection window 7200. Otherwise, the window changes to the function selection window 7300. Further, when the group management button 7101 is pressed in the IC card scan window 7100, the window changes to a group management window 9000 described later in FIG. 8. When a "Back" button is pressed, the window changes to the previous window. Note that, in the following, the description of "Back" button on each window will be omitted to avoid redundancy.

The internal operation in a process related to the IC card scan window 7100 is as follows. The MFP 101 generates a user name and a password for the policy server 311 from the unique ID of the IC card read by the IC card reading device 131. An example of the generation method is illustrated below. The policy server administrator inputs and sets an arbitrary character string of a certain length in advance for the user ID generation key 604 and the password generation key 605 in the policy server setting window 600 of FIG. 4. The MFP 101 generates a character string obtained by providing the user ID generation key 604 to the unique ID of the IC card and applies a unidirectional hash function such as SHA-256, for example, to generate a unique user name. Similarly, the MFP 101 generates a character string obtained by providing the password generation key 605 to the unique ID of the IC card and applies a unidirectional hash function to generate a unique password. Note that, instead of the method using the unidirectional hash function in the above example, another method may be employed as along as it is a mechanism that can generate a unique value from a unique ID of an IC card. In such a way, the user name and the password that are dynamically registered to the policy server from the unique ID of the IC card are dynamically generated. Further, if MFPs have the same registered user ID generation key 604 and password generation key 605 for the policy server administrator, it is possible for the MFPs to handle them as the same user on the policy server. In contrast, when these are different registrations, they are handled as different users on the policy server.

The MFP 101 requests the policy server 311 to confirm the existence of the user name generated from the unique ID of the IC card. The policy server 311 returns, to the MFP 101, a result as to whether or not the user having the specified user name exists, and thus, if the user name does not exist, the window changes to the initial function selection window 7200. On the other hand, if the user name exists, the window changes to the function selection window 7300.

If the user exists for the existence confirmation request for the user name, the corresponding user ID is returned from the policy server 311 to the MFP 101. In such a case, the MFP 101 requests the policy server 311 to acquire a group to which the user ID belongs. In the present embodiment, the number of groups to which one user can belong is limited to one, and a single group ID to which the specified user belongs is returned from the policy server 311 to the MFP 101. Note that a single user may belong to a plurality of groups without being limited to one group. On the other hand, if the user does not exist for the existence confirmation request for the user name, no user ID is returned. In such a case, information indicating that the user is not yet registered may be returned from the policy server 311 to the MFP 101, for example.

Selection buttons of save locations for the scanned file ("Save in USB" 7201, "Save in cloud" 7202) and a group setting button 7203 are displayed in the initial function selection window 7200. When intending to set a group provided with a policy, the user presses the group setting button 7203. In such a case, the window changes to a group setting window 7400. Note that, although USB and cloud are listed as examples of save locations, another storage such as a local storage in the MFP 101, a file server, or the like other than the above may be specified.

Further, when the "Save in USB" 7201 or the "Save in cloud" 7202 is selected in the initial function selection window 7200 or the function selection window 7300, a save location selection window 7600 is displayed. Note that, when group setting is not performed but a save location is selected in the initial function selection window 7200, a group to which only the IC card held over by the user belongs is newly created, and a policy is applied to the group. As described later, information of another user's IC card can be added to the group later. Accordingly, a policy that can be accessed in the same manner as for the user who performed a scan can be applied even with another user's IC card.

Creation of a new group will now be described. When a new group is created, first, an arbitrary group name is created at the MFP 101, and the MFP 101 requests the policy server 311 to create a new group in the created group name. The group name may be any character string such as a random number, a hash value generated from an IC card unique ID, or the like, for example. A group management table 1010 illustrated in FIG. 9 is an example of the initial state of a group management table, and no group has been registered. Note that, although the group management table 1010 does not illustrate a state where another group is already registered as an example for simplified illustration, the essence of the present embodiment remains the same even in the state where another group is already registered.

At the policy server 311, a unique group ID is generated, the generated group ID and a group name passed from the MFP 101 are registered in the group management table 410, and the MFP group ID is returned. At this time, since an error is returned from the policy server 311 when the same group name exists in the group management table 410, another group name is generated to create a new group again. The state of a group management table after this process is performed corresponds to a group management table 1110 illustrated in FIG. 10, and a group has been added thereto.

Herein, a basic policy applied to each group is registered in advance in the policy management table. A policy management table 1020 illustrated in FIG. 9 is an example of the basic policy, "Base_" is fixedly provided to the prefix of the policy name. In this example, two basic policies of "Base_Print and view permission" and "Base_View expiration term (one week)" are registered. The "Base_Print and view permission" is a policy by which only printing and viewing are permitted from a restriction list. The "Base_View expiration term (one week)" is a policy by which only printing is permitted from a restriction list and only a week is effective after policy is applied.

After creating a new group, the MFP 101 requests the policy server 311 to acquire a policy list. Once acquiring a policy list managed by the policy server 311, the MFP 101 starts searching for a basic policy. Specifically, the MFP 101 picks up a policy name starting with "Base_". The MFP 101 generates a group name by replacing "Base" of the prefix part "Base_" of the found policy name with the group ID of the created group. The MFP 101 then requests the policy server 311 to copy the corresponding basic policy in accordance with the created policy name. In the example of FIG. 9, the two basic policies are copied, for example, if the group ID is "Gacdg0357", the policy names will be "Gacdg0357_Print and view permission" and "Gacdg0357_View expiration term (one week)". Furthermore, the MFP 101 requests the policy server 311 to change a policy application target to the group ID for a policy copied from a basic policy. Thereby, a policy having the same access right as the basic policy and applicable to the created policy is generated. The state of the policy management table after these processes have been performed corresponds to a policy management table 1120 illustrated in FIG. 10, policies 1121 and 1122 having the same authority as the basic policies are added thereto, and the added group is a policy application target.

Note that, since no user has been registered in the group indicated by the created group ID in this state, user registration is performed. The user management table 1000 illustrated in FIG. 9 is an example of the initial state of the user management table, and only the policy server administrator user (administrator) has been registered therein. Note that, although the user management table 1000 illustrates as an example the state where only the administrator of the policy server 311 is already registered for simplified illustration, the essence of the present embodiment is the same even in a state where another user is already registered.

The MFP 101 requests the policy server 311 to perform user registration with the user name and the password generated from the unique ID of the IC card. In response to completion of the registration, a unique user ID is returned from the policy server 311 to the MFP 101. The state of the user management table after this process has been performed corresponds to a user management table 1100 illustrated in FIG. 10, and a user has been added thereto.

The MFP 101 then requests the policy server 311 to add the user indicated by the returned user ID to the group indicated by the previously created group ID. The state of the group management table after these processes have been performed corresponds to a group management table 1110 illustrated in FIG. 10, and the user ID has been registered in a belonging user ID list of the group indicated by the previously created group ID.

The new group button 7401 and the existing group button 7402 are displayed in a group setting window 7400 illustrated in FIG. 6A. When the new group button 7401 is pressed, a group to which only the IC card held over by the user belongs is created, and the window changes to the function selection window 7300. When the existing group button 7402 is pressed, the window changes to a group addition window 7500.

In the group addition window 7500, when another IC card is held over, this another IC card is used to cause the IC card of the user who performs the current scan to belong to the already created group. If a group has already been created on the policy server 311, a policy that defines the group as a policy application target exists in the policy management table as described previously. In the same manner as described previously, the MFP 101 generates the user name and the password from the unique ID of the IC card read by the IC card reading device 131 in the group addition window 7500. In the same way below, the MFP 101 issues an existence confirmation request for the user name generated from the unique ID of the IC card to the policy server 311 and acquires the user ID from the policy server 311. The MFP 101 requests the policy server 311 to acquire a group to which the returned user ID belongs, and one group ID to which the specified user belongs is returned from the policy server 311 to the MFP 101.

Furthermore, the MFP 101 requests the policy server 311 to perform user registration with the user name and the password generated from the unique ID of the IC card read in the IC card scan window 7100. In response to this request, a unique user ID is returned from the policy server 311 to the MFP 101. Furthermore, the MFP 101 requests the policy server 311 to register a user ID corresponding to the IC card read in the IC card scan window 7100 for the group ID of the group to which the user of the IC card read in the group addition window 7500 belongs. Thereby, the group can add the user of the IC card currently read in the IC card scan window 7100 for the applicable existing policy.

Note that a policy is applied to a group. Thus, in accordance with a policy, the user of the IC card read in the IC card scan window 7100 can access not only a currently scanned document but also an already created document with which the policy has been provided to the group.

For example, it is assumed that there is a group G1 created with an IC card A and a document X applies a policy to the group G1. It is then assumed that a secure scan is performed with an IC card B, the IC card B is caused to belong to the group G1, and a document Y that has applied the policy to the group G1 is created. In this case, both the IC card A and the IC card B can access the document X and the document Y in accordance with the policy applied to the group G1. In such a way, only by performing reading of an IC card on the MFP 101 without setting an access right finely on an IC card basis, it is possible to easily perform operation in which a policy is simply applied.

A save location selection window 7600 illustrated in FIG. 6A is a window used for selecting a directory of a save location. Although only one window is illustrated as an example for simplicity in this description, the window changes between directories in response to selection of a directory. Once a directory of a save location is decided in the save location selection window 7600, the window changes to a policy selection window 7700.

In the policy selection window 7700, policies applicable to a group to which the user corresponding to the IC card read in the IC card scan window 7100 belongs are displayed in a selectable manner as with a policy list 7701. Herein, once a policy applied to a scanned document is selected and "OK" button is pressed, the window changes to a scan window 7800 of FIG. 6B.

For both of a case where a group is newly created and a case where an existing group is used, a group ID to which a policy is applied has been acquired before this step. The MFP 101 requests the policy server 311 to acquire a policy list for the group ID. In response to this request, the policy server 311 returns the held policy list to the MFP 101. Since the policy list is a set of a policy ID and a policy name, the MFP 101 extracts a policy ID having the group ID as a prefix out of the returned policy IDs.

For example, a case where the group ID is "Gacdg0357" and the state of a policy table is in the state of the policy management table 1120 illustrated in FIG. 10 will be described as an example. Four policy IDs "P_00002", "P_00012", "P_00013", and "P_00014" are returned from the policy server 311 to the MFP 101. The MFP 101 confirms respective policy names of returned policy IDs to search for the policy whose prefix is "Gacdg0357". A part obtained by deleting the group ID of the prefix from the policy name of the found policy is the policy name to be displayed on the screen. In this example, two policy names "Gacdg0357_Print and view permission" and "Gacdg0357_View expiration term (one week)" are changed to "Print and view permission" and "View expiration term (one week)", which are displayed on the screen.

The start button 7801 and the detail setting button 7802 are present in the scan window 7800 of FIG. 6B. In the scan window 7800, while a scan setting specified in advance by the policy server administrator is set as the default, if a change is desired, the detail setting button 7802 is pressed. Note that, since the change of the detail setting related to a scan is not the essence of the present embodiment, the window example or the description thereof will be omitted.

Once the start button 7801 is pressed in the scan window 7800, the MFP 101 reads a manuscript by the scanner 121, generates a document, and encrypts the document by applying a specified policy (FIG. 5A). Since the process of scanning and generating a document may be of any method as long as it generates a document to which a policy can be applied, the description thereof will be omitted.

A document management table 1030 illustrated in FIG. 9 is an example of the initial state of a document management table, and no document has been registered therein. Note that, although the document management table 1030 does not illustrate a state where another document is already registered as an example for simplified illustration, the essence of the present embodiment remains the same even in the state where another document is already registered. The MFP 101 specifies a policy ID corresponding to the policy name selected in the policy selection window 7700 and issues a document registration request to the policy server 311. In response to this request, the policy server 311 registers a document and returns a document ID and an encryption key to the MFP 101. Furthermore, the policy server 311 registers the returned document ID and encryption key and the policy ID specified from the MFP 101 in the document management table.

The state of the document management table after this process has been performed corresponds to a document management table 1130 illustrated in FIG. 10, and a document (document ID: D_2031) to which a policy is applied at this time has been added thereto. The MFP 101 then embeds the document ID returned from the policy server 311 and the location (URL) of the policy server 311 in the scanned document. Furthermore, the MFP 101 encrypts the scanned document by using the encryption key returned from the policy server 311. Note that the document ID and the location (URL) of the policy server 311 embedded in the document are not to be encrypted so as to be accessible after the encryption. Encryption may be performed as an example by using a common key encryption scheme such as AES, for example, and any encryption method may be employed as long as it is in a form that can perform decryption later by using an encryption key. In such a way, it is possible to apply a policy to a group (user) corresponding to an IC card for a scanned document. Note that, in the MFP 101, a document encrypted as described above is stored in a specified save location.

5. Example of Printing

Figure 7:
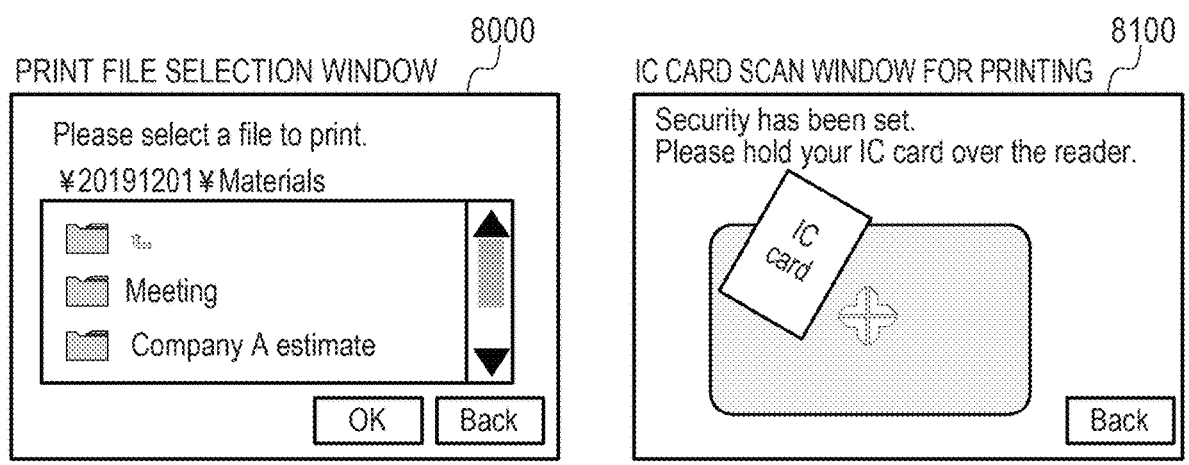
FIG. 7 is a diagram illustrating a print window of the MFP.

The operation of printing, at the MFP 101, a document to which a policy set by using the scheme of the present embodiment is applied will be described with reference to FIG. 7. FIG. 7 is a diagram illustrating an example of a printing window of the MFP 101.

When printing is selected in the menu window 7000 of FIG. 6A, the window changes to a print file selection window 8000 illustrated in FIG. 7. In the print file selection window 8000, a document is selected in a save location such as a USB memory, a cloud storage, or the like. Note that the description of transfer within a directory in the print file selection window 8000 will be omitted as with a scan described previously.

The MFP 101 confirms whether or not a document selected in the print file selection window 8000 is a document to which a policy is applied. In a confirmation method, if the URL of the policy server 311 and the document ID are embedded in the selected document, it is determined that the document is a document to which a policy is applied. In a case of a normal document to which no policy is applied, a print process is directly performed. On the other hand, in a case of a document to which a policy is applied, the window changes to a printing IC card scan window 8100.

The MFP 101 confirms the policy applied to the document to determine whether or not printing is possible, and if possible, performs printing (FIG. 5B). At this time, the MFP 101 urges the user performing printing to holds its IC card over the IC card reading device 131 and acquires the unique ID of the IC card in the same manner as in the process of a secure scan described previously. The MFP 101 generates a user name and a password from the unique ID of the IC card read by the IC card reading device 131. The MFP 101 logs in the policy server 311 with the generated user name and password and requests acquisition of access restriction list of the acquired document ID. In response to this request, for a specified document, the policy server 311 returns an access restriction assigned to the user ID and an encryption key to the MFP 101. The MFP 101 confirms whether or not a condition that enables printing is included in the access restriction returned from the policy server 311. If printing is enabled, the MFP 101 uses the returned encryption key to decrypt a document, performs printing, and outputs a printed document to the printer 122. The detailed description for printing will be omitted. Note that, if printing is not enabled, the MFP 101 inhibits printing of the document and displays a notification thereof on the display 119.

6. Example of Group Management

Figure 8:
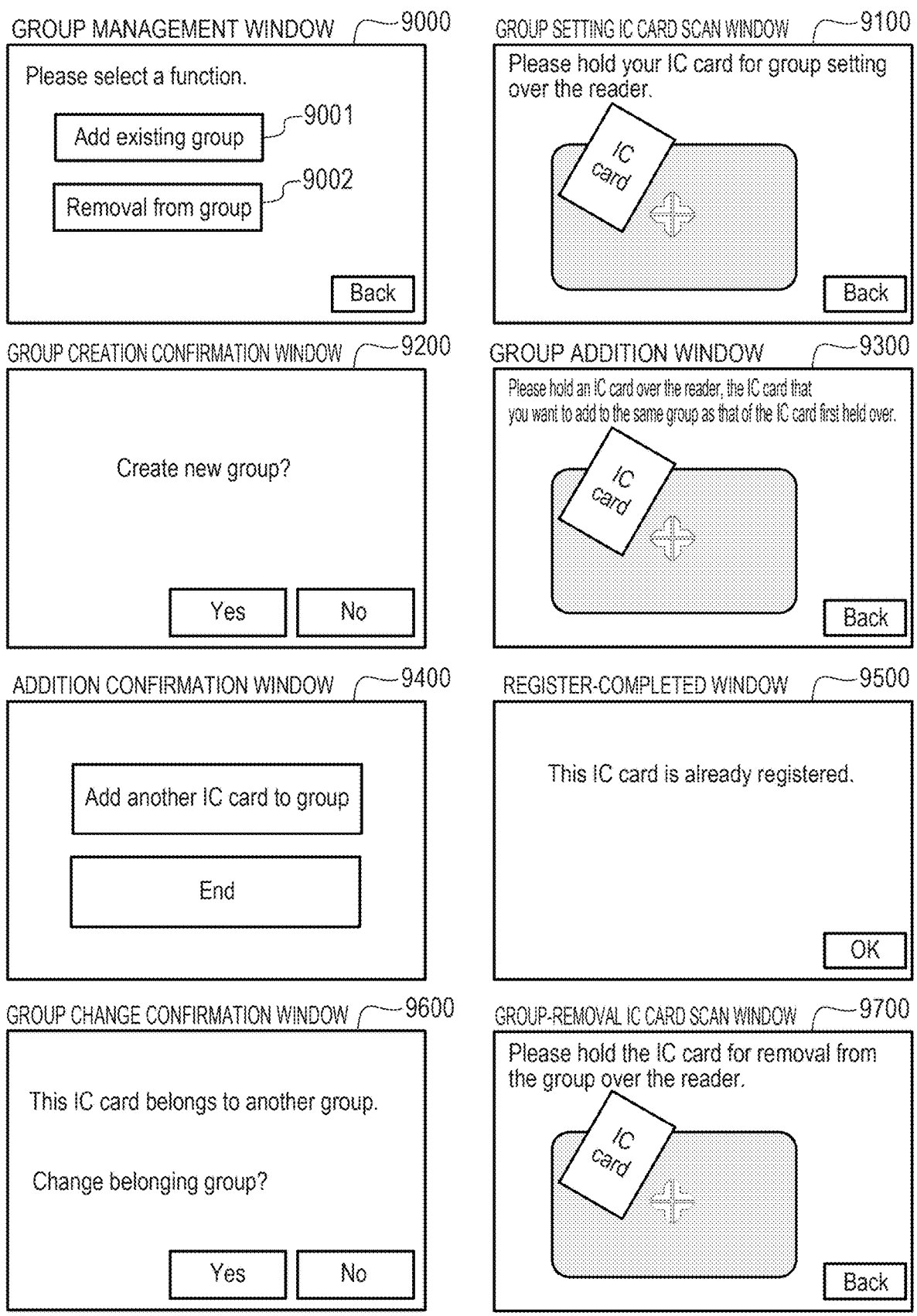
FIG. 8 is a diagram illustrating a group management window of the MFP.

The operation of performing group management at the MFP 101 will be described below with reference to FIG. 8. FIG. 8 is a diagram illustrating an example of a group management window of the MFP 101. When the group management button 7101 is pressed in the IC card scan window 7100 of FIG. 6A, the window changes to the group management window 9000.

The existing group addition button 9001 and the removal-from-group button 9002 are displayed in the group management window 9000. When the existing group addition button 9001 is pressed in the group management window 9000, the window changes to a group setting IC card scan window 9100. On the other hand, when the removal-from-group button 9002 is pressed in the group management window 9000, the window changes to a group-removal IC card scan window 9700.

Note that, when creating a new group, the user may create the new group by using the existing group addition button 9001 or performing a scan without performing the operation of belonging to the existing group in the initial function selection window 7200 as described previously.

In the group setting IC card scan window 9100, the user who intends to perform group setting holds its IC card over the IC card reading device 131. In the same manner as in the IC card scan window 7100 described previously, the MFP 101 generates a user name and a password for the policy server 311 from the unique ID of the IC card read by the IC card reading device 131. Furthermore, the MFP 101 issues an existence confirmation request for the user name generated from the unique ID of the IC card to the policy server 311. In response to the request, the policy server 311 returns, to the MFP 101, a result as to whether or not the user having the specified user name exists. If the user name does not exist, the MFP 101 changes the window to a group creation confirmation window 9200, and on the other hand, if the user name exists, the MFP 101 changes the window to a group addition window 9300.

When the "Yes" button is pressed in the group creation confirmation window 9200 and creation of a new group is selected, a group is created at the policy server 311 in the same manner as illustrated with the initial function selection window 7200 described previously. The group ID is then returned from the policy server 311 to the MFP 101. Further, similarly, the policy server 311 copies a basic policy and adds the group ID to the policy name as a prefix. Furthermore, the policy server 311 adds the created user to the created group. In the MFP 101, to add another user to the created group, the window changes to the group addition window 9300.

Note that, in the group setting IC card scan window 9100, if the user exists for the existence confirmation request for the user name, the corresponding user ID is returned from the policy server 311 to the MFP 101. The MFP 101 requests the policy server 311 to acquire a group to which the returned user ID belongs. In response to this request, the group ID to which the specified user belongs is returned from the policy server 311 to the MFP 101. As described previously, in the present embodiment, the number of groups to which a user belongs is limited to one. In the MFP 101, the window changes to the group addition window 9300 in order to add another user to the group having the returned group ID.

The group addition window 9300 is a window used for reading an IC card intended to be added to a group to which a user generated from the unique ID of the IC card held over in the group setting IC card scan window 9100 belongs.

In the group addition window 9300, once the IC card is held over, the MFP 101 reads the unique ID of the IC card by the IC card reading device 131 and generates a user name and a password for the policy server 311 in the same manner as described previously. The MFP 101 issues an existence confirmation request for the user name generated from the unique ID of the IC card to the policy server 311 and acquires the user ID in the same manner as described for the group management window 9000.

If the user corresponding to the IC card held over in the group addition window 9300 does not exist in the policy server 311, the MFP 101 requests the policy server 311 to perform user registration with the user name and the password generated from the unique ID of the IC card. In response to completion of the registration, the user ID is returned from the policy server 311 to the MFP 101. On the other hand, if the user corresponding to the IC card held over in the group addition window 9300 exists in the policy server 311, the user ID is already returned from the policy server 311. The MFP 101 requests the policy server 311 to acquire a group to which the returned user ID belongs and acquires the group ID.

Note that, as described above, since the number of groups to which one user can belong is limited to one and a user always belongs to a group in the present embodiment, that is, since a case where only users are registered in the policy server 311 and no user belongs to a group cannot occur typically, the description thereof will be omitted. If the acquired group ID matches the group ID corresponding to the IC card held over in the group setting IC card scan window 9100, since the acquired group ID is already registered to a desired group, the window changes to a registration-completed window 9500. The registration-completed window 9500 displays an already registered message and returns to the group addition window 9300.

On the other hand, if the group ID corresponding to the IC card held over in the group addition window 9300 does not match the group ID corresponding to the IC card held over in the group setting IC card scan window 9100, the user is already registered in another group. In such a case, the window changes to a group change confirmation window 9600.

The group change confirmation window 9600 is a confirmation window as to whether or not to change a group to which the IC card held over in the group addition window 9300 belongs. If a belonging group is not changed (if a "No" button is pressed), the window returns to the group addition window 9300. On the other hand, if a belonging group is changed (if a "Yes" button is pressed), the following process is performed.

The MFP 101 requests the policy server 311 to acquire a user list for the group ID, and the user list belonging to the group ID is then returned from the policy server 311. The MFP 101 confirms users included in the returned user list. If no user having a user ID other than the user ID corresponding to the IC card held over in the group setting IC card scan window 9100 is included, since the group is unnecessary, the MFP 101 deletes the policy related to the group and this group.

Specifically, the MFP 101 requests the policy server 311 to acquire a policy list for the group ID and receives a returned held policy list from the policy server 311. The MFP 101 extracts a policy having the group ID as a prefix from the returned policy list. The MFP 101 passes the policy ID of the extracted policy to the policy server 311 and requests for deletion of the policy. When a plurality of policies are extracted, the policies are deleted for all the extracted policies. Furthermore, the MFP 101 requests the policy server 311 to delete a group for the group ID. The MFP 101 confirms users included in the returned user list.

On the other hand, if a user having a user ID other than the user ID corresponding to the IC card held over in the group setting IC card scan window 9100 is included, another user belongs to the group. Thus, the MFP 101 requests deletion, from the group, of the user ID of the user corresponding to the IC card held over in the group management window 9000.

In response to the end of group deletion or the like, user addition to a group is performed. Specifically, the MFP 101 requests the policy server 311 to add a user to the group to add the user ID corresponding to the IC card held over in the group addition window 9300 to the group ID corresponding to the IC card held over in the group management window 9000. Accordingly, since the IC card held over in the group addition window 9300 was successfully added to the group, the window changes to an addition confirmation window 9400.

In the addition confirmation window 9400, it is selected whether to add another IC card to the group or end the process. When another IC card is added to the group, the window returns to the group addition window 9300.

In the group-removal IC card scan window 9700, an IC card of a user who intends to delete a group setting is held over the IC card reading device 131. In the same manner as in the IC card scan window 7100 described previously, the MFP 101 generates a user name and a password for the policy server 311 from the unique ID of the IC card read by the IC card reading device 131. The MFP 101 issues an existence confirmation request for the user name generated from the unique ID of the IC card to the policy server 311, and the user ID is returned. The MFP 101 requests the policy server 311 to acquire a group to which the returned user ID belongs and acquires a group ID. The MFP 101 requests the policy server 311 to acquire a user list corresponding to the returned group ID, and a user list belonging to the group ID is returned.

If the user list belonging to the group ID includes only the user ID, the MFP 101 deletes a policy related to the group, deletes the group, and deletes the user. The MFP 101 requests the policy server 311 to acquire a policy list, and the policy server 311 returns the held policy list. The MFP 101 extracts a policy having the group ID as a prefix from the returned policy list. Furthermore, the MFP 101 passes the policy ID of the extracted policy to the policy server 311 and requests for deletion of the policy. Note that, when a plurality of policies are extracted, the MFP 101 deletes policies for all the extracted policies. Furthermore, the MFP 101 requests the policy server 311 to delete a group for the group ID. Furthermore, the MFP 101 requests the policy server 311 to delete the user ID.

On the other hand, if a user ID of another user is included in the user list belonging to the group ID of the user, the MFP 101 deletes the user from the belonging group. The MFP 101 requests the policy server 311 to delete the user ID of the user corresponding to the IC card held over in the group management window 9000 from the belonging group.

7. Description of Flowchart
7.1 Flowchart of Secure Scan

Figure 11A:
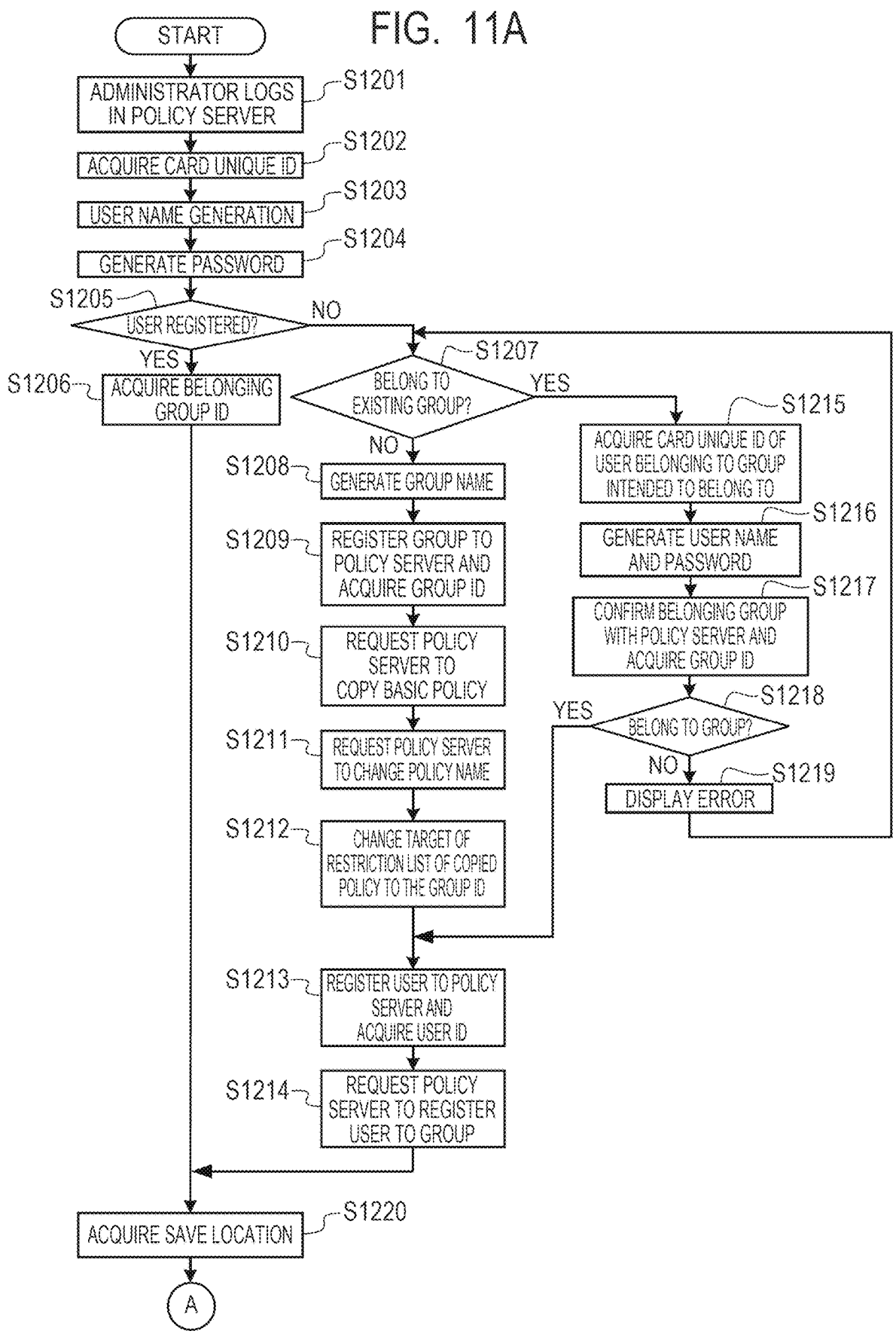
FIG. 11A is a flowchart illustrating a process of a secure scan.
Figure 11B:
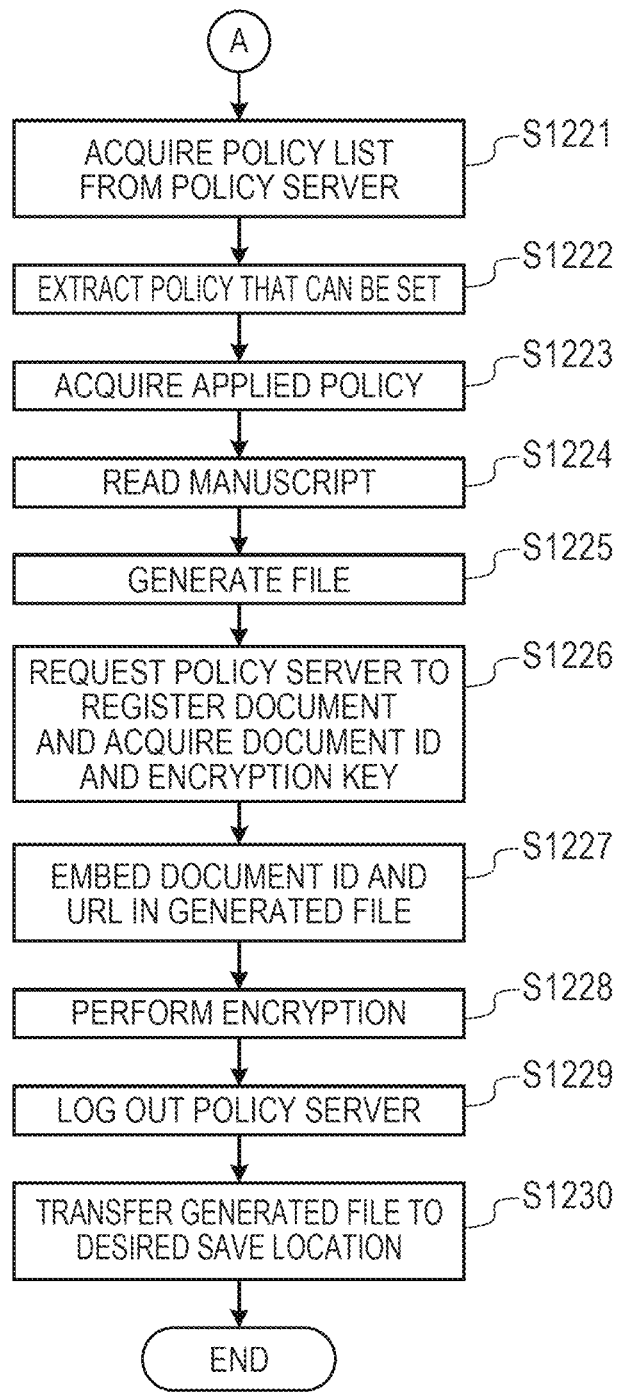
FIG. 11B is a flowchart illustrating a process of the secure scan.

Details of a process of a secure scan to provide a policy of the present embodiment will be described with reference to flowcharts of FIG. 11A and FIG. 11B. FIG. 11A and FIG. 11B are flowcharts illustrating an example of a process of a secure scan performed by the display operation control unit 201, the document storage control unit 208, and the policy control unit 212 and correspond to the process of the client illustrated in FIG. 5A. The process of the display operation control unit 201, the document storage control unit 208, and the policy control unit 212 is performed when a program stored in the ROM 113 is controlled by the CPU 111. The policy control unit 212 requests each control unit to perform the flow below. The flowchart is started in response to the display operation control unit 201 detecting via the input control I/F 114 that the secure scan button 7001 is pressed in the menu window 7000. Since a process related to an error is not the essence of the present embodiment, the description thereof is omitted.

First, in S1201, the policy control unit 212 logs in the policy server 311 on the network as a policy server administrator. Specifically, the policy control unit 212 acquires information related to the policy server (an address of the policy server 311 to be connected, a policy server administrator ID, a password, or the like) from the policy server setting table 1500 stored in the management DB 220. The policy control unit 212 logs in the policy server 311 on the network 102 via the network control unit 203 as a policy server administrator by using the communication I/F controller 117 based on the acquired information related to the policy server. Note that, since a process related to an anomaly such as a case where login fails is not the essence, the process related to anomalies will be omitted for simplified illustration. In the following description, since the policy server on the network 102 is accessed by using the communication I/F controller 117 via the network control unit 203 and the same applies to the communication with the policy server 311, the description thereof will be omitted.

Next, in S1202, the policy control unit 212 acquires a card unique ID of an IC card from the IC card reading device 131 by using the IC card control I/F 130. The reading from an IC card is performed by using a known technology. The card unique ID is a unique number that is recorded in an IC chip and is unable to be rewritten.

Next, in S1203, the policy control unit 212 generates a user name used for registration as a user of the policy server 311. Specifically, the policy control unit 212 acquires the user ID generation key 1504 from the policy server setting table 1500 stored in the management DB 220. Furthermore, the policy control unit 212 generates a character string that is a combination of the card unique ID acquired in S1202 described above and the user ID generation key, applies a unidirectional hash function thereto, and generates a unique user name. Note that the method of generating a user name is not limited thereto, and another scheme may be employed as long as it can generate a unique name.

Next, in S1204, the policy control unit 212 generates a user password used for registration as a user of the policy server 311. Specifically, the policy control unit 212 acquires the password generation key 1505 from the policy server setting table 1500 stored in the management DB 220. Furthermore, the policy control unit 212 generates a character string that is a combination of the card unique ID acquired in S1202 described above and the password generation key, applies a unidirectional hash function thereto, and generates a unique password. Note that the method of generating a password is not limited thereto, and another scheme may be employed as long as it can generate a unique name.

Next, in S1205, the policy control unit 212 determines whether or not the user name generated in S1203 described above is already registered in the policy server 311. The policy control unit 212 has logged in the policy server 311 as the policy server administrator in S1201 described above and therefore performs, on the policy server 311, existence confirmation of the user having the user name generated in S1203 described above. If the user name exists, a user ID is returned from the policy server 311 to the policy control unit 212. If the user ID is returned, the policy control unit 212 determines that the user exists (S1205, Yes) and proceeds with the process to S1206.

On the other hand, if no user ID is returned, the policy control unit 212 determines that the user does not exist (S1205, No) and proceeds with the process to S1207. Although comparison is performed with the user name generated in S1203 in the present embodiment, whether or not registration to the policy server has been made may be determined by using unique information that can be acquired from an IC card, such as a card unique ID, instead of the user name, for example. In such a case, the unique information that can be acquired from the IC card will be registered to the policy server 311 as information related to the user.

In S1206, since the user name generated in S1203 described above exists in the policy server 311, the policy control unit 212 acquires a group ID to which the user belongs. Specifically, the policy control unit 212 requests the policy server 311 to acquire a group to which the user name generated in S1203 described above belongs. The policy control unit 212 acquires a group list to which the user name belongs returned from the policy server 311. In the present embodiment, since description is provided with the example in which one user belongs to one group, only one group is returned. After the process of S1206, the policy control unit 212 proceeds with the process to S1220. Note that the process on and after S1220 will be described later.

Next, a process of a case of No in S1205 will be described. In S1207, since the user does not exist in the policy server 311, the policy control unit 212 determines whether to newly generate a group or cause the user to belong to a group that has been generated by another user (IC card). The display operation control unit 201 transfers an instruction input by the user performing a secure scan on the group setting window 7400 to the policy control unit 212, and the policy control unit 212 makes a decision. If the user is not caused to belong to an existing group (S1207, No), that is, if a group is newly created, the policy control unit 212 proceeds with the process to S1208. On the other hand, if the user is caused to belong to an existing group (S1207, Yes), the policy control unit 212 proceeds with the process to S1215.

In S1208, the policy control unit 212 generates a group name. Since a group name may be any name as long as it is unique, a unique identifier such as Universally Unique Identifier (UUID) may be generated, or a group name may be generated by another method.

Next, in S1209, the policy control unit 212 creates a group with the group name generated in S1208 described above for the policy server 311 and acquires a group ID that identifies the group. Specifically, the policy control unit 212 requests the policy server 311 to create the group name generated in S1208 described above and acquires a group ID returned from the policy server 311.

Next, in S1210, the policy control unit 212 requests the policy server 311 to copy a basic policy. As described previously, the basic policy is a policy that is a base for a policy applied to the group. Specifically, the policy control unit 212 requests the policy server 311 to acquire a policy list. Furthermore, the policy control unit 212 finds out a basic policy from the policy list returned from the policy server 311. For example, as a basic policy, those having a policy name starting with "Base_" are found out. The policy control unit 212 requests the policy server 311 to copy the found basic policy.

Next, in S1211, the policy control unit 212 defines that the basic policy copied in S1210 described above is a policy used for the group created in S1209 described above. Specifically, the policy control unit 212 causes the policy server 311 to change the prefixes of the policy names of all the basic policies copied in S1210 described above to the group ID acquired in S1209 described above.

Next, in S1212, the policy control unit 212 causes the policy for the group whose name has been changed in S1211 described above to be targeted to the group. Specifically, in S1211 described above, the policy control unit 212 instructs the policy server 311 to change, to the group ID acquired in S1209 described above, the target of a restriction list of all the policies whose names have been changed for the group created in S1209 described above.

Next, in S1213, the policy control unit 212 instructs the policy server 311 to register the user with the user name generated in S1203 described above and the password generated in S1204 described above. Since the user ID of the registered user is returned from the policy server 311, the policy control unit 212 acquires the user ID.

Next, in S1214, the policy control unit 212 instructs the policy server 311 to add the user registered in S1213 described above to the group created in S1209 described above. In accordance with the above process from S1208 to S1214, a new group to which the user related to the IC card acquired in S1202 described above belongs is created, and the policy applicable thereto has been prepared.

Next, the process in a case of Yes in S1207 will be described. In S1215, the policy control unit 212 reads a unique ID of another IC card belonging to a group to which the user related to the IC card read in S1201 described above is intended to belong. This process is to only read information of a different IC card and is the same as the process of S1202 described above.

Next, in S1216, the policy control unit 212 generates a user name and a password from the unique information of the IC card acquired in S1215 described above. This process is the same as S1203 and S1204 described above.

Next, in S1217, the policy control unit 212 acquires a group to which the user related to the IC card read in S1215 belongs for the policy server 311. Specifically, the policy control unit 212 requests the policy server 311 to perform existence confirmation for the user name generated in S1216 and acquires a user ID. Furthermore, the policy control unit 212 requests the policy server 311 to acquire a group list to which the acquired user ID belongs. The policy server 311 returns the group ID of the belonging group, and the policy control unit 212 thus acquires this group ID.

Next, in S1218, the policy control unit 212 confirms whether or not the user of the IC card read in S1215 described above belongs to a group. Specifically, the policy control unit 212 determines whether or not a group ID is acquired in S1217 described above. Note that, if the user of the IC card read in S1215 described above is not yet registered in the policy server 311 or does not belong to any group, no group ID is acquired. If a group ID is acquired in S1217 described above, it is determined that the user belongs to a group. On the other hand, if no group ID is acquired, it is determined that the user does not belong to any group.

In S1217 described above, if the user of the IC card read in S1215 described above does not belong to any group (S1218, No), the policy control unit 212 proceeds with the process to S1219. In S1219, the policy control unit 212 uses the display operation control unit 201 to display an error window (not illustrated) on the display 119 and returns the process to S1207.

On the other hand, in S1217 described above, if the user of the IC card read in S1215 described above belongs to a group (S1218, Yes), the policy control unit 212 proceeds with the process to S1213 and performs a registration process for the user of the IC card read in S1201.

In S1220, the policy control unit 212 acquires a save location for a document generated by a secure scan. For example, the display operation control unit 201 transfers, to the policy control unit 212, an instruction for a save location input by the user performing a secure scan on the save location selection window 7600, and the policy control unit 212 acquires the instruction.

Next, in S1221, the policy control unit 212 acquires a policy list of the policy server 311. Specifically, the policy control unit 212 requests the policy server 311 to acquire a policy list and acquires the policy list.

Next, in S1222, the policy control unit 212 extracts a policy that can be set by the group in which the user of the IC card read in S1201 described above is registered. As described previously, a group ID is set in the prefix of a policy. Thus, the policy control unit 212 extracts a policy having the group ID set as the prefix out of the policy list acquired in S1221 described above.

Next, in S1223, the policy control unit 212 displays the policy extracted in S1222 described above on the policy selection window 7700, for example, and acquires a policy selected by the user and intended to be applied to a document. The display operation control unit 201 receives an operation performed on the touch panel via the input control I/F 114 and transfers an instruction to the policy control unit 212, and thereby the policy control unit 212 acquires a policy applied to a document.

Next, in S1224, the document storage control unit 208 reads a manuscript. The document storage control unit 208 operates the scanner 121 to read a manuscript placed on an ADF or a thick plate. The operation to perform a scan and generate a document is a known operation.

Next, in S1225, the document storage control unit 208 converts the document read in S1224 described above into a file of a format to which a policy can be applied. The format to which a policy can be applied is a format such as PDF, Microsoft Office, or the like, for example, but is not limited thereto.

Next, in S1226, the policy control unit 212 registers the document generated in S1225 described above to the policy server 311 and acquires a document ID and an encryption key. Specifically, the policy control unit 212 requests the policy server 311 to perform document registration and acquires a document ID and an encryption key returned from the policy server 311.

Next, in 51227, the policy control unit 212 embeds address information (URL) on the policy server 311 and the document ID acquired in S1226 described above in the file generated in S1225 described above.

Next, in S1228, the policy control unit 212 uses the encryption key acquired in S1226 described above to encrypt the text of the file generated in S1225 described above. Since the encryption scheme may be any scheme that can perform encryption and decryption with the encryption key, it does not matter what method is employed. The reason why only the text is encrypted is that the document ID and the address information (URL) on the policy server embedded in S1226 described above are required to be referenced in another environment.

Next, in S1229, the policy control unit 212 instructs the policy server 311 for logout. Next, in 51230, the document storage control unit 208 transfers the file encrypted in S1228 described above to the save location acquired in S1220 described above and stores the file.

As set forth, according to the process of these flowcharts, with a simple operation such as touch by the IC card, it is possible to generate a file to which a policy based on unique information of an IC card is applied. Further, since a policy can be handled for a group involving users corresponding to a plurality of IC cards, the same policy can be applied not only to a user who has performed a scan but also to a plurality of users belonging to the group. Note that, if a policy is intended to be applied to only the person in question, a group to which the person in question belongs but other users do not belong can be set.

7.2 Flowchart of Printing Policy Applied Document

Details of the process of printing a document to which a policy is provided in accordance with the flowcharts of FIG. 11A and FIG. 11B will be described with reference to the flowchart of FIG. 12. Although an example for printing will be described for better understanding of the description, the same can apply to other operations such as viewing or edition. The flowchart of FIG. 12 illustrates the process as a desired process without identifying printing.

Figure 12:
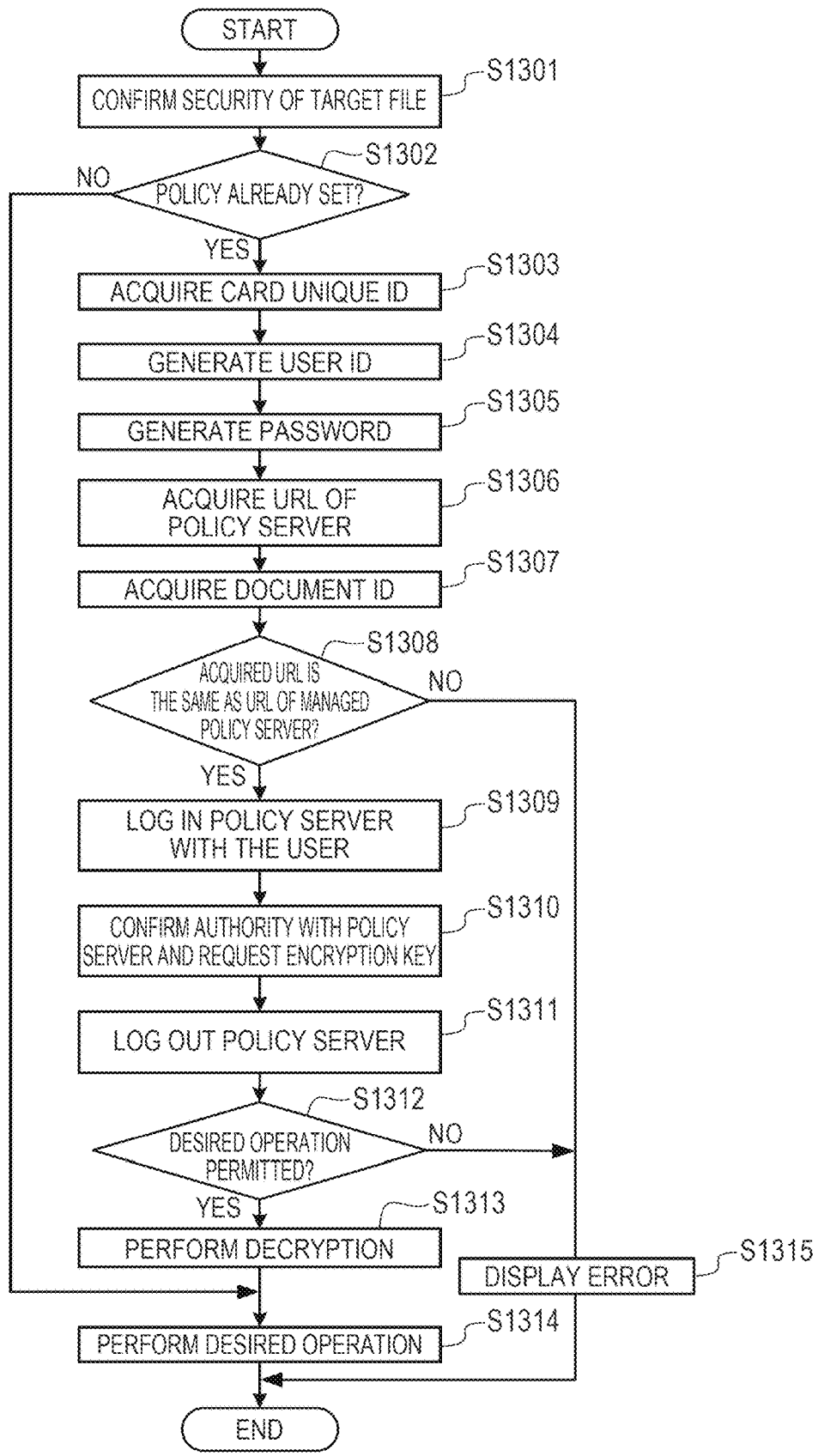
FIG. 12 is a flowchart illustrating a process of operating a policy-provided document.

FIG. 12 is a flowchart illustrating an example of a process of operating (for example, printing) a document provided with a policy performed by the display operation control unit 201, the document usage control unit 207, and the policy control unit 212 and corresponds to the process of the client illustrated in FIG. 5B. The process of the display operation control unit 201, the document usage control unit 207, and the policy control unit 212 is performed when a program stored in the ROM 113 is controlled by the CPU 111. The policy control unit 212 requests each control unit to perform the flow below. For example, the flowchart is started in response to the display operation control unit 201 detecting via the input control I/F 114 that the print button 7002 is pressed in the menu window 7000 and a print target file is specified. Since a process of selecting a file of a print target and a process related to an error is not the essence of the present embodiment, the description thereof is omitted.

First, in S1301, the policy control unit 212 confirms a target file (print target file in this example). Specifically, the policy control unit 212 confirms whether or not address information (URL) on the policy server 311 and a document ID are embedded in a file.

Next, in S1302, the policy control unit 212 determines whether or not a policy is set for the target file based on the confirmation in S1301 described above. If neither the address information (URL) on the policy server 311 nor the document ID is embedded in the target file, the policy control unit 212 then determines that the file is a normal file to which no policy is set (S1302, No) and proceeds with the process to S1314. Then, a desired process (normal printing operation in this example) is performed.

On the other hand, if the address information (URL) on the policy server 311 and the document ID are embedded in the target file, the policy control unit 212 determines that a policy is set (S1302, Yes) and proceeds with the process to S1303.

In S1303, the policy control unit 212 acquires a card unique ID of an IC card from the IC card reading device 131 by using the IC card control I/F 130. This is the same process as described with S1202 or the like.

Next, in S1304, the policy control unit 212 generates a user name used for registration as a user of the policy server 311. This is the same as the process described with S1203 or the like. Next, in S1305, the policy control unit 212 generates a password of the user used for registration as a user of the policy server 311. This is the same as the process described with S1204.

Next, in S1306, the policy control unit 212 acquires the address information (URL) of the policy server 311 embedded in the target file. Next, in 51307, the policy control unit 212 acquires the document ID embedded in the target file.

Next, in S1308, the policy control unit 212 compares the address information (URL) on the policy server 311 acquired in S1306 described above with the address 1501 of the policy server setting table 1500 illustrated in FIG. 4 and determines whether or not the address information (URL) and the address 1501 are the same. If not the same (S1308, No), the policy control unit 212 determines that the file is a file that references a policy server different from a policy server that is set so as to be referenced by the MFP 101 and proceeds with the process to S1315. In S1315, the policy control unit 212 issues an instruction to display an error window (not illustrated) and ends the process of this flowchart.

On the other hand, if the URL acquired in S1306 described above and the address 1501 are the same (S1308, Yes), the policy control unit 212 proceeds with the process to S1309.

In S1309, the policy control unit 212 logs in the policy server 311 by using the user ID generated in S1304 and the password generated in S1305. In S1310, the policy control unit 212 requests the policy server 311 to confirm authority for the document ID acquired in 51307 described above and acquire an encryption key in order to decrypt and operate (for example, print) the encrypted file. The policy control unit 212 then acquires an encryption key and an authority list returned from the policy server 311. Next, in S1311, the policy control unit 212 requests the policy server 311 for logout.

Next, in S1312, the policy control unit 212 confirms whether or not a desired operation (printing in this example) is permitted in the authority list acquired in S1310 described above. If the desired operation (printing) is not permitted (S1312, No), the policy control unit 212 proceeds with the process to S1315. In S1315, the policy control unit 212 issues an instruction to display an error window (not illustrated) indicating that the desired operation (printing) is not permitted and ends the process of this flowchart.

On the other hand, if the desired operation (printing) is permitted (S1312, Yes), the policy control unit 212 proceeds with the process to S1313. In S1313, the policy control unit 212 decrypts the target file by using the encryption key acquired in S1310 described above. The decryption is performed by a method corresponding to the method used for the encryption. As illustrated in FIG. 11A and FIG. 11B, encryption and decryption may be of any methods as long as encryption and decryption can be performed.

Next, in S1314, the policy control unit 212 performs the desired process (printing in this example) on data of the file decrypted in S1313 described above. In a case of printing, the document usage control unit 207 issues an instruction to the printer 122.

As set forth, according to the process of this flowchart, an operation in accordance with a policy based on unique information of an IC card for an operation target file can be performed with a simple operation such as touch by the IC card. That is, an operation against a policy is unable to be performed.

7.3 Flowchart for Managing Policy Applied Group

Figure 13A:
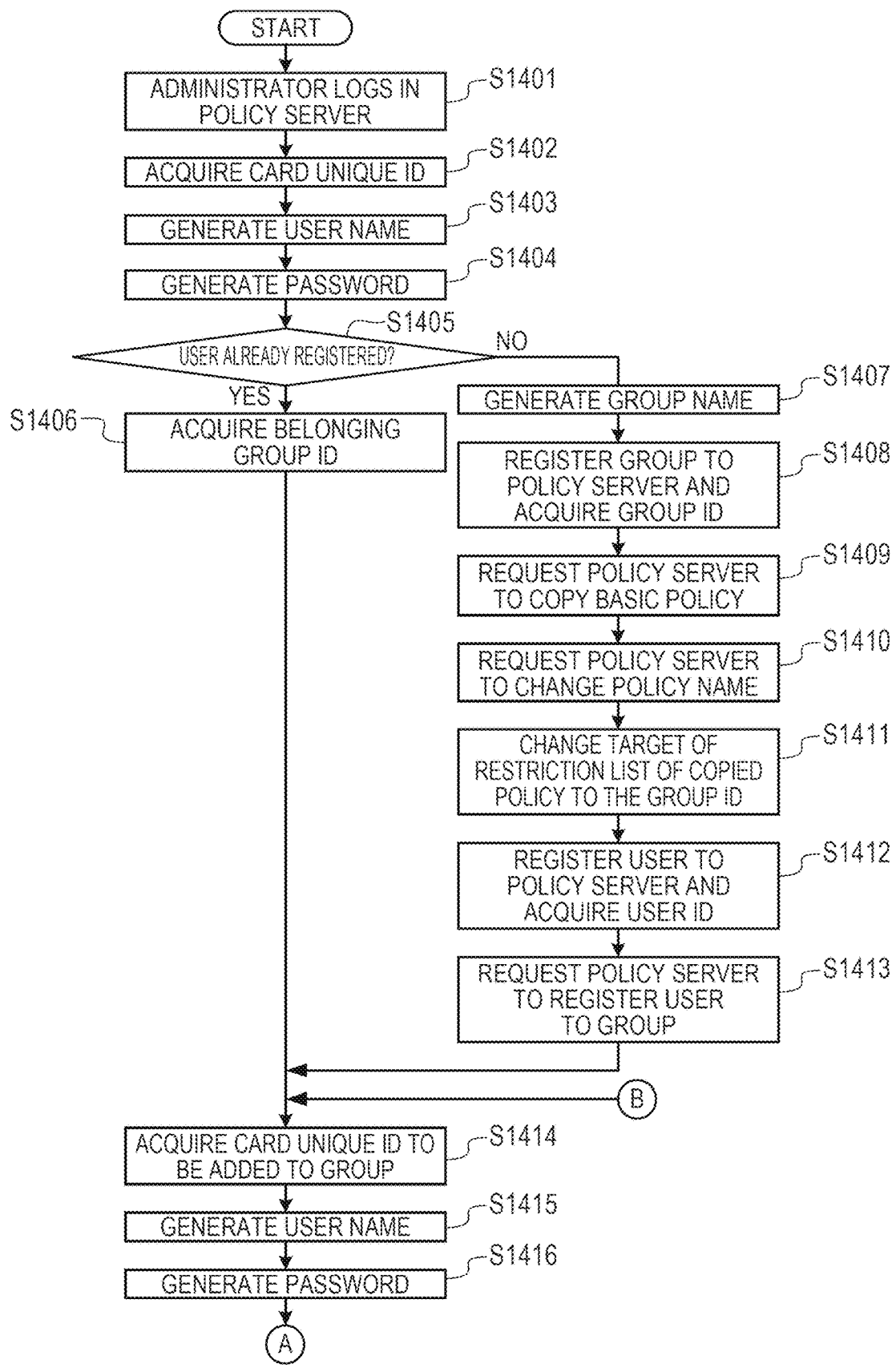
FIG. 13A is a flowchart illustrating a process of performing group management.
Figure 13B:
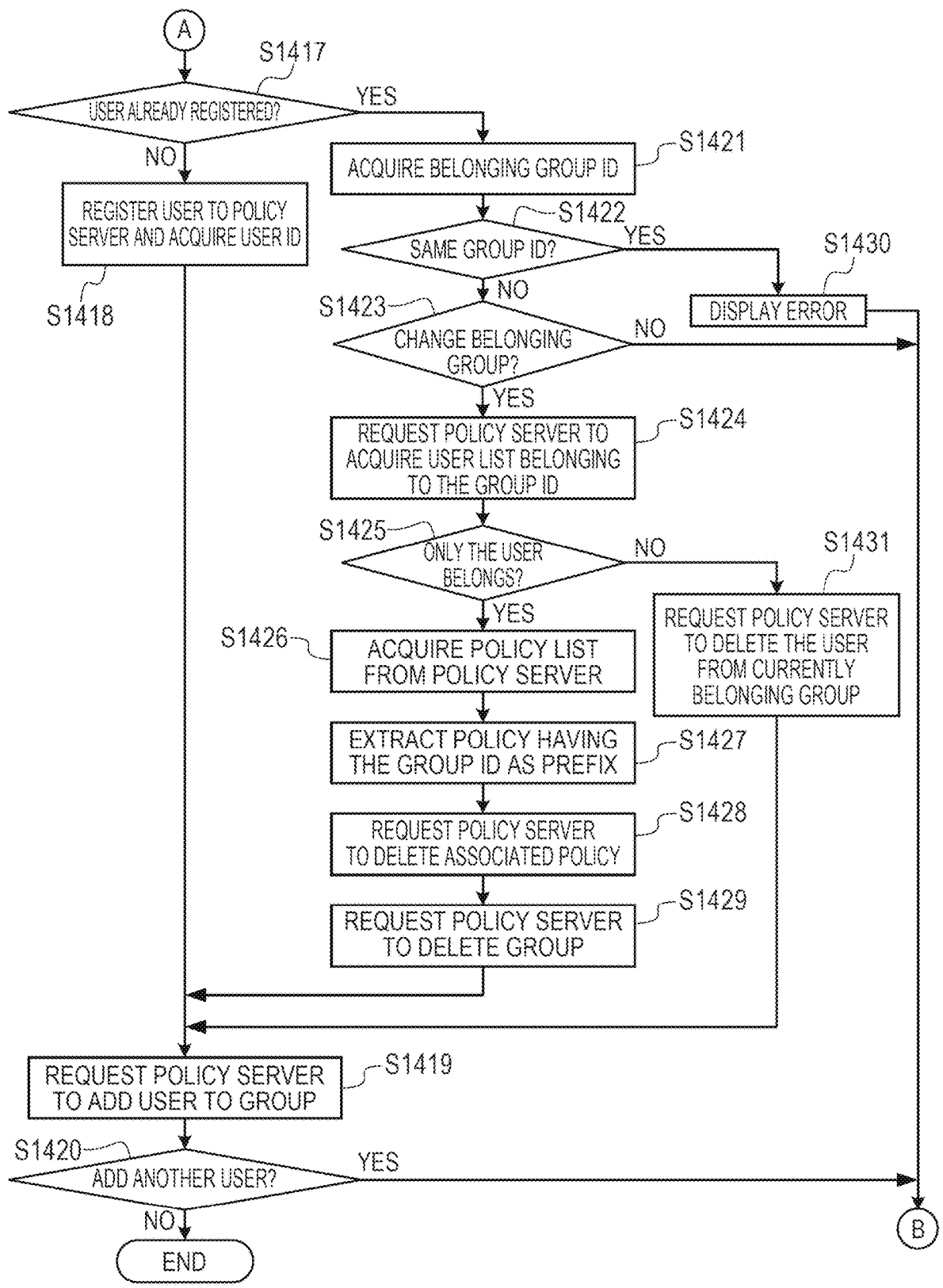
FIG. 13B is a flowchart illustrating a process of performing the group management.

Details of a process of managing a group for which a policy is applied to a document will be described with reference to flowcharts of FIG. 13A and FIG. 13B. FIG. 13A and FIG. 13B are flowcharts illustrating an example of a process for group management performed by the display operation control unit 201 and the policy control unit 212. The process of the display operation control unit 201 and the policy control unit 212 is performed when a program stored in the ROM 113 is controlled by the CPU 111. The policy control unit 212 requests each control unit to perform the flow below. The flowchart is started in response to the display operation control unit 201 detecting via the input control I/F 114 that the existing group addition button 9001 is pressed in the group management window 9000. Since a process related to an error is not the essence of the present embodiment, the description thereof is omitted.

First, in S1401, the policy control unit 212 logs in the policy server 311 on a network as a policy server administrator. This is the same as S1201.

Next, in S1402, the policy control unit 212 acquires a card unique ID of an IC card from the IC card reading device 131 by using the IC card control I/F 130. This is the same as the process described with S1202 or the like. Note that the IC card read in S1402 is a base for group management. In the following, if there is a group to which a user generated from the IC card read in S1402 belongs, the user generated from another IC card is added to the group. On the other hand, if there is no group to which a user generated from the IC card read in S1402 belongs, a group is newly created, and a user generated from another IC card is added to the created group.

Next, in S1403, the policy control unit 212 generates a user name handled as a user of the policy server 311. This is the same process as described with S1203 or the like. Next, in S1404, the policy control unit 212 generates a password of the user of the policy server 311 generated in S1403 described above. This is the same as the process described with S1204.

Next, in S1405, the policy control unit 212 determines whether or not the user name generated in S1403 described above is already registered in the policy server 311. This is the same as the process described with S1205. Note that, if the user name is already registered, the user ID is returned from the policy server 311 to the policy control unit 212. If the user ID is returned, the policy control unit 212 determines that the user generated in S1403 described above is already registered (S1404, Yes) and proceeds with the process to S1406. On the other hand, if the user ID is not returned, the policy control unit 212 determines that the user generated in S1403 described above is not yet registered (S1404, No) and proceeds with the process to S1407.

In S1406, the policy control unit 212 acquires a group ID to which the user that is a base for group management belongs from the policy server 311. This is the same as the process described with S1206. After the process of S1406, the policy control unit 212 proceeds with the process to S1414. The process on and after S1414 will be described later.

In S1407, the policy control unit 212 generates a group name. This is the same as described with S1208. In the following, since the process of S1408 to S1413 are also the same as S1209 to S1214 of the flowchart of FIG. 11A and FIG. 11B, the description thereof will be omitted. In accordance with the process of S1407 to S1413, a base group used for performing group management is created. After the process of S1413, the policy control unit 212 proceeds with the process to S1414.

In S1414, the policy control unit 212 acquires a card unique ID from an IC card added to a group to which the user related to the IC card read in S1402 described above belongs. This is the same process as described with S1202 or the like.

Next, in S1415, the policy control unit 212 generates a user name handled as a user of the policy server 311 from the card unique ID of the IC card acquired in S1414 described above. This is the same process as described with S1203 or the like. The user created in S1415 is a user to be added to a base group corresponding to the IC card read in S1402 described above.

Next, in S1416, the policy control unit 212 generates a password of the user of the policy server 311 generated in S1415 described above. This is the same process as described with S1204.

Next, in S1417, the policy control unit 212 determines whether or not the user name generated in S1415 described above is already registered in the policy server 311. This is the same process as described with S1205. If the user name generated in S1415 described above is already registered (S1417, Yes), the policy control unit 212 proceeds with the process to S1418. On the other hand, if the user name generated in S1415 described above is not yet registered (S1417, No), the policy control unit 212 proceeds with the process to S1421.

In S1418, the policy control unit 212 requests the policy server 311 to register the user with the user name generated in S1415 described above and the password generated in S1416 described above and acquires a user ID returned from the policy server 311. This is the same as described with S1213. After the process of S1418, the policy control unit 212 proceeds with the process to S1419. The process on and after S1419 will be described later.

In S1421, the policy control unit 212 acquires a group ID to which the user generated in S1415 described above belongs from the policy server 311. This is the same process as S1217.

Next, in S1422, the policy control unit 212 determines whether or not the group ID acquired in S1406 described above and the group ID acquired in S1421 described above are the same. If the group ID acquired in S1406 described above and the group ID acquired in S1421 described above are the same (S1422, Yes), the policy control unit 212 proceeds with the process to S1430. In this case, the user related to the IC card read in S1414 described above is already registered in the base group. In S1430, the policy control unit 212 issues an instruction to display an error window as with a registration-completed window 9500, returns the process to S1414, and performs control to add the user of another IC card to the group.

On the other hand, if the group ID acquired in S1406 described above and the group ID acquired in S1421 described above are not the same (S1422, No), the policy control unit 212 proceeds with the process to S1423. In this case, the IC card read in S1414 described above is already registered as the user of another group.

In S1423, the policy control unit 212 confirms whether or not to change a belonging group of the IC card read in S1414 described above. For example, the display operation control unit 201 transfers a determination result of the user to the policy control unit 212 on the window as with the group change confirmation window 9600, and the policy control unit 212 performs the determination based on a user operation. Then, if the belonging group is not changed (S1423, No), the policy control unit 212 returns the process to S1414 and performs control to add the user of another IC card to the group.

On the other hand, if the belonging group is changed (S1423, Yes), the policy control unit 212 proceeds the process to S1424. In S1424, the policy control unit 212 acquires a user list belonging to the group with the group ID acquired in S1421 described above. Specifically, the policy control unit 212 requests the policy server 311 to acquire a user list by specifying the group ID and acquires the user list belonging to the group returned from the policy server 311.

Next, in S1425, the policy control unit 212 determines whether or not the user list acquired in S1424 described above includes only the user generated in S1415 described above. Then, if the user list acquired in S1424 described above includes only the user generated in S1415 described above, the policy control unit 212 determines that only the user belongs to the group (S1425, Yes) and proceeds with the process to S1426. In this case, only the user generated in S1415 described above belongs to the group with the group ID acquired in S1421 described above. Thus, if the user leaves the group, there is no user belonging to the group. Thus, in the process of S1426 to S1429, it is required to delete the group and the policy applied to the group. This will be described below in detail.

In S1426, the policy control unit 212 requests the policy server 311 to acquire a policy list and acquires a policy list returned from the policy server 311. The policy list returned from the policy server 311 is formed of a combination of a policy ID and a policy name.

Next, in S1427, the policy control unit 212 extracts a policy ID whose policy name has the group ID acquired in S1421 described above as the prefix out of the policy list acquired in S1426 described above.

Next, in S1428, the policy control unit 212 requests the policy server 311 to delete the policy for all the policy IDs extracted in S1427 described above. Next, in S1429, the policy control unit 212 requests the policy server 311 to delete the group with the group ID acquired in S1421 described above.

On the other hand, in S1425 described above, if the user list acquired in S1424 described above includes a user other than the user generated in S1415 described above (S1425, No), the policy control unit 212 proceeds with the process to S1431. In this case, since a user other than the user generated in S1415 described above exists in the group, the group or the policy applied to the group is unable to be deleted.

In S1431, the policy control unit 212 deletes only the user generated in S1415 described above from the group. Specifically, the policy control unit 212 requests the policy server 311 to delete the user generated in S1415 from the group with the group ID acquired in S1421. After the process of S1431, the policy control unit 212 proceeds with the process to S1419, In S1419, the policy control unit 212 requests the policy server 311 to add the user generated in S1415 described above to the group ID acquired in S1406 or S1408 described above. Note that, if S1419 is called from S1418 described above, a newly registered user is added to a base group. Further, if S1419 is called from S1429 or S1431 described above, the user has belonged to another group but leaves the group and is newly added to the base group.

In S1420, the policy control unit 212 confirms whether or not to add another IC card to the base group. For example, the display operation control unit 201 transfers a result of determination of the user to the policy control unit 212 on a window as with the addition confirmation window 9400, and the policy control unit 212 performs the determination based on a user operation.

If another IC card is added (S1420, Yes), the policy control unit 212 returns the process to S1414 and performs control to add the user of another IC card to the group. On the other hand, if another IC card is not added (S1420, No), the policy control unit 212 ends the process of this flowchart.

Note that the process when the removal-from-group button 9002 of the group management window 9000 of FIG. 8 is pressed is to perform the process of deleting the user (IC card) from the base group. Since this process can be implemented by the process of S1421, S1424 to S1429, and S1431 of FIG. 13B, the description thereof will be omitted.

As set forth, according to the process of these flowcharts, with a simple operation such as touch by the IC card, it is possible to generate a file to which a policy based on unique information of an IC card is applied. Further, since a policy can be handled for a group involving users corresponding to a plurality of IC cards, the same policy can be applied not only to a user who has performed a scan but also to a plurality of users belonging to the group. Note that, if a policy is intended to be applied to only the person in question, a group to which only the person in question belongs but other users do not belong can be set.

As illustrated above, the first embodiment is configured to generate a user name and a password by using a unique ID of an IC card, for example, dynamically generate a user to a policy server, and provide a policy to a document. Accordingly, it is possible to generate a highly secured document provided with a policy in a simple method by using an image processing apparatus such as an MFP or a scanner in an environment used by an unspecified number of users. That is, with a simple operation such as holding the IC card over the MFP, it is possible to easily generate a file to which a policy is applied. Further, similarly, with a simple operation such as holding the IC card over the MFP, it is possible to apply the same policy as a group to a plurality of IC cards and it is also possible to share a file maintained secured between a plurality of users. To realize the above, a provider that has installed an MFP in a shared office or the like has only to perform the setting of a policy server as with FIG. 4. Communication between a client (MFP) and a policy, such as management of a user or a group in a policy server, addition of a policy to a document, a document operation in accordance with a policy, or the like is performed inside the MFP and does not require a provider of a shared office or the like to be involved. Accordingly, a secure scan environment that does not require a provider of a shared office or the like to perform complex user management, policy management, or the like can be constructed at low cost.

Second Embodiment

The first embodiment described above is configured to add a user or a group to which a policy is applied. In such a configuration, when the user (group) no longer uses a shared office or the like, a useless user or group will remain to be registered. In such a case, unnecessary resources remain to be secured, and if a large amount of registration remain, this will affect the performance. Further, in particular, since an MFP placed in the environment such as a shared office is used by an unspecified number of users, it is difficult for the shared office provider to recognize who uses the MFP, and it is not possible to determine which user can be deleted. It is therefore difficult for a shared office provider or the like to delete a useless user or group through a manual operation. Accordingly, in the present embodiment, a configuration to automatically delete an unnecessary user or group will be described.

FIG. 14A is a diagram illustrating an example of a policy server setting window 1600 and a policy server setting table 1610 in the second embodiment. The policy server setting window 1600 and the policy server setting table 1610 correspond to the policy server setting window 600 and the policy server setting table 1500 of FIG. 4, respectively. However, a non-use user deletion days 1601 is added to the policy server setting window 1600, and a field of non-use user deletion days 1611 is added to the policy server setting table 1610.

In the non-use user deletion days 1601, the MFP administrator inputs and sets in advance the number of days until a user who has not used a policy server is deleted. The MFP administrator is a provider that has installed the MFP in a shared office or the like in general. The non-use user deletion days 1601 corresponds to the number of days elapsed from the last time the user accessed the policy server 311, and the user exceeding this number of days has not accessed for a certain period of time and thus is deleted. While described later, in response to the user deletion, if it is required to delete an associated group or policy, the deletion thereof is performed at the same time. The value input to the non-use user deletion days 1601 is recorded in the field of non-use user deletion days 1611 of the policy server setting table 1610 stored in the management DB 220.

A user management table of the second embodiment will be described below. FIG. 14B is a diagram illustrating an example of a user management table of the second embodiment. As illustrated in FIG. 14B, a user management table 1800 of the second embodiment is a table in which a last access date and time field 1801 is added to the user management table 400 of FIG. 3A. If there is a user for which the date and time obtained by adding the number of days recorded in the field of non-use user deletion days 1611 to the date and time recorded in the last access date and time field 1801 exceeds the current time, the user is to be deleted.

Note that, although the timing of the last access is illustrated as date and time as an example in the example of FIG. 14B, only a date may be used, or any information that can indicate no use for a certain period of time may be used without being limited to date and time or the last access date and time. Further, a form to record the last access date and time in a user management table of the policy server 311 is an example, and a form in which the last access date and time or the like is managed in a storage region other than the user management table may be employed. For example, a database corresponding to a user management table is arranged in a storage on the cloud that can be accessed from an MFP, and the user management table is updated in the storage on the cloud at the same time the user management table is updated. A form in which a user management table in the storage on the cloud is referenced when confirming whether or not to delete the user may be employed.

Figure 15:
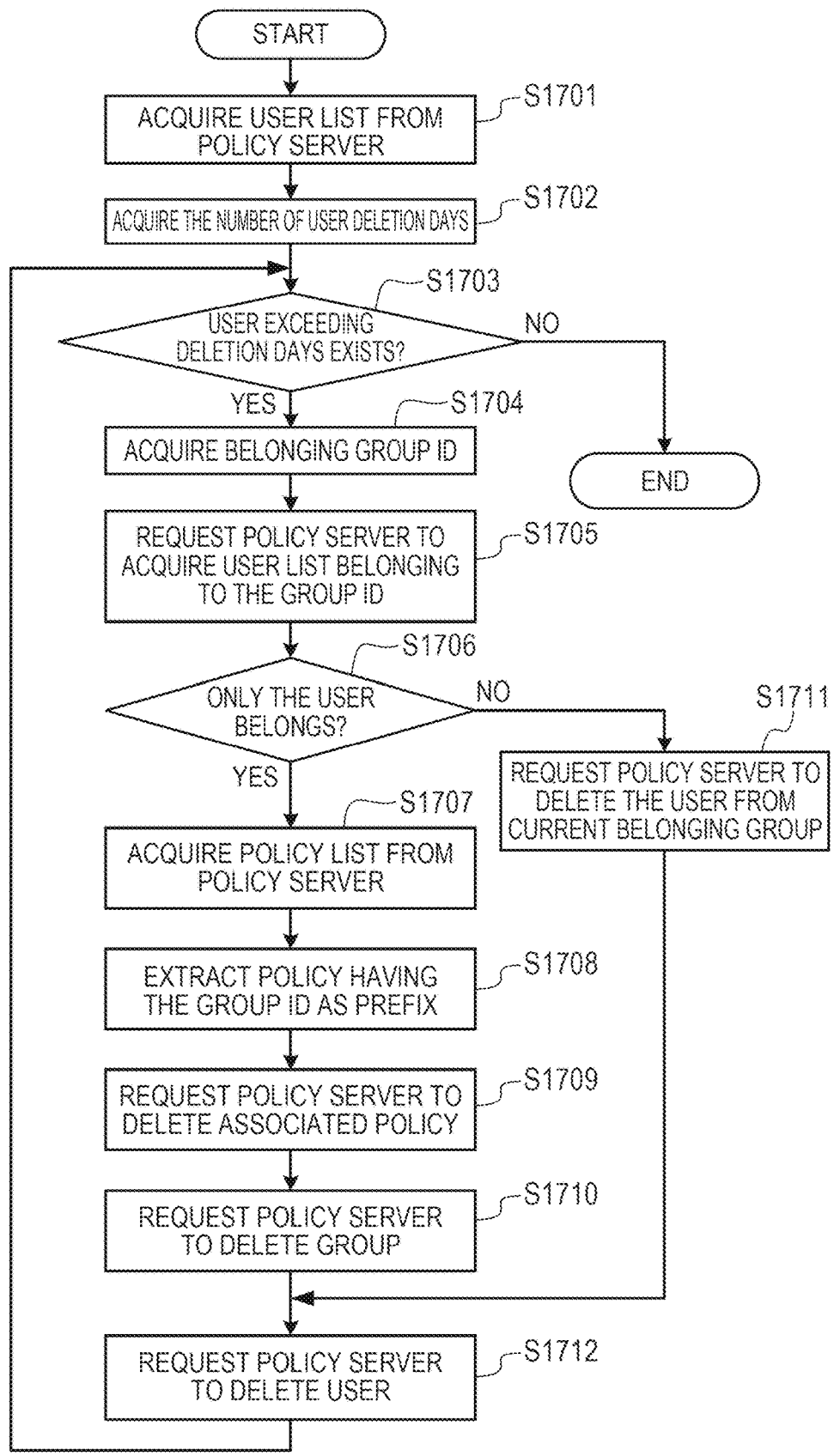
FIG. 15 is a flowchart illustrating a process of deleting a user or a group in the second embodiment.

Deletion of a user or a group will be described with reference to the flowchart of FIG. 15. FIG. 15 is a flowchart illustrating an example of a process of deletion of a user or a group performed by the policy control unit 212. The process of the policy control unit 212 is performed when a program stored in the ROM 113 is controlled by the CPU 111. The policy control unit 212 requests each control unit to perform the flow below. Since a process related to an error is not the essence of the present embodiment, the description thereof is omitted. This flowchart is started every constant period by a timer or the like (not illustrated) executed in the CPU 111. For example, this flowchart is performed at 0 o'clock every day when the MFP is less used. The start time or an execution interval are set through a setting window (not illustrated) by the MFP administrator.

First, in S1701, the policy control unit 212 requests the policy server 311 to acquire a user list and acquires information on all the users stored in the user management table 1800 returned from the policy server 311. Next, in S1702, the policy control unit 212 references the non-use user deletion days 1611 to acquire the number of non-use user deletion days.

Next, in S1703, the policy control unit 212 confirms whether or not there is a user for which the non-use user deletion days have elapsed from the last access date and time for the user acquired in S1701 described above. Specifically, it is confirmed whether or not the last access date and time field 1801 of the user list acquired in S1701 is before the date and time that is a subtraction of the non-use user deletion days 1611 acquired in S1702 from the current date and time.

If there is no user for which the non-use user deletion days have elapsed (S1703, No), the policy control unit 212 ends this flowchart process.

On the other hand, if there is a user for which the non-use user deletion days have elapsed (S1703, Yes), the policy control unit 212 selects one user ID of the associated user and proceeds with the process to S1704.

In S1704, the policy control unit 212 acquires a group ID to which the user ID acquired in S1703 described above belongs. This process is the same as S1421. Next, in S1705, the policy control unit 212 requests the policy server 311 to acquire a list of all the users belonging to the group ID acquired in S1704 described above. This process is the same as S1424.

Next, in S1706, the policy control unit 212 determines whether or not the user included in the user list acquired in S1705 described above includes only the user ID selected in S1703 described above. This process is the same as S1425. Then, if the user included in the user list acquired in S1705 described above includes only the user selected in S1703 described above, the policy control unit 212 determines that only the user belongs to the group (S1706, Yes) and proceeds with the process to S1707.

In S1707 to S1710, since only the user is included in the group, both deletion of the target group and deletion of the policy applied to the group are necessary and thus deleted together. This process is the same as S1426 to S1429. After the process of S1707 to S1710, the policy control unit 212 proceeds with the process to S1712.

On the other hand, in S1706 described above, if a user other than the user selected in S1703 described above is included in the user list acquired in S1705 described above, the policy control unit 212 does not determine that only the user belongs to the group (S1706, No) and proceeds with the process to S1711.

In S1711, since the users included in the user list acquired in S1705 described above include a user with a user ID other than the user ID selected in S1703 described above, the policy control unit 212 delete only the user from this group.

This process is the same as S1431. After the process of S1711, the policy control unit 212 proceeds with the process to S1712.

In S1712, the policy control unit 212 requests the policy server 311 to delete the user with the user ID selected in S1703 described above. The policy control unit 212 then returns the process to S1703 described above and performs control to confirm whether or not there is another user for which the non-use user deletion days have elapsed except for the deleted user.

As set forth, according to the second embodiment, even with automatic addition of a user or a group to which a policy is applied, an unnecessary user or group that no longer uses an MFP or an unnecessary associated policy can be automatically deleted without requiring the MFP administrator's effort.

Third Embodiment

Although a basic policy prepared in advance is copied and applied to an associated group in the first embodiment described above, a policy in which an original access right is set may be able to be applied. The third embodiment illustrates an example that enables application of policy in which an original access right is set.

FIG. 16 is a diagram illustrating an example of a policy selection window of the third embodiment. For example, an original policy creation button 19001 is provided in a policy selection window 19000, and this addresses to a case where the user intends to create a policy by itself.

Once the original policy creation button 19001 is pressed, the window changes to an access right setting window 19100, and this enables creation of a user-original policy. Note that, when an existing policy selection button 19101 is pressed in the access right setting window 19100, the window may change back to the policy selection window 19000.

In the access right setting window 19100, the user sets an access right 19102. In this example, expiration terms from print permission, view permission, and creation of a document can be set on a day basis. Once the access right 19102 is set and the "OK" button is pressed, the policy control unit 212 creates an original policy based on the set access right. The policy control unit 212 transmits, to the policy server 311, the content of the access right, a group ID of a group to which the user based on a card unique ID of the IC card read in the IC card scan window 7100 or the like belongs, or the like and requests registration of a policy. At this time, the name representing the original policy may be specified on the MFP 101 side and transmitted to the policy server 311. The policy server 311 uses the fixed name representing the original policy prefixed with a group ID as a policy name and creates and registers an original policy corresponding to the access right.

For example, when the fixed name representing the original policy is "OriginalPolicy" and the group ID is "G_acdg0357", the policy name will be "G_acdg0357_OriginalPolcy". This policy is then applied to a scanned document. Note that the fixed name representing the original policy is a reserved term and therefore is unavailable as a policy name.

Further, when users of the same group perform a secure scan described later, filtering by a group ID is performed as described with S1222 of FIG. 11B. Thereby, the original policy created for each group is included in choices in the policy selection window 19000 and can be reused. Although the example in which only a single original policy is registered with a fixed name is illustrated, a plurality of original policies may be registered for each group. In such a case, the policies may be named as "G_acdg0357_OriginalPolcy1", "G_acdg0357_OriginalPolcy2", and "G_acdg0357_OriginalPolcy3".

As set forth, according to the third embodiment, it is possible to set a user-original policy with a simple operation.

Fourth Embodiment

Although a unique ID of an IC card has been used to create a user name and a password in the policy server 311 so far, the embodiment is not limited thereto. For example, a two-dimensional code or the like such as a QR code (registered trademark) distributed for each user may be used to create a user name and a password. A user name and a password may be directly embedded in a QR code, or a unique ID such as a unique ID of an IC card may be embedded in a QR code and may be handled in the same manner as a unique ID of an IC card.

Instead of a window prompting the user for the IC card reading, such as the IC card scan window 7100, a window prompting the user for a QR code reading may be displayed, and the QR code may be read by using the scanner 121. In such a case, the process of reading the unique ID of the IC card, such as S1202, S1215, S1303, S1402, S1414, or the like of the flowcharts described previously is replaced with a process of reading a unique ID of a QR code. Further, an IC card and a QR code are not exclusive, and the embodiment may be such that the user is able to select both an IC card and a QR code.

Fifth Embodiment

In the first embodiment, an applicable policy is extracted from the policy server 311 to the group, and the policy selection window 7700 is displayed in S1222 of FIG. 11B. The user has to select a policy to be applied every time. Accordingly, a form in which the policy selected previously remains in a state selected in advance may be employed. Since the same policy is often applied every time, the user's effort to select a policy at the time of a secure scan can be reduced.

A specific example will be illustrated below. In the initial selection after a group is created, the user is caused to select a policy to be applied to a document in the policy selection window 7700. For example, if "G_acdg0357 Print expiration term (one week)" is selected, a keyword indicating the selection is embedded between a group ID of a prefix and a policy name. For example, if the keyword is "Selected", the policy server 311 is requested to change the policy name as "G_acdg0357 Selected Print expiration term (one week)".

Then, if the user belonging to the group performs a secure scan, the policy having a policy name with the above keyword denoted is included in a policy list acquired in S1221 by the policy control unit 212. In S1222, when extracting a policy that can be set by the group, the policy control unit 212 further extracts a policy name including the keyword out of the extracted policies and controls the extracted policy in a selected state.

Figure 17:
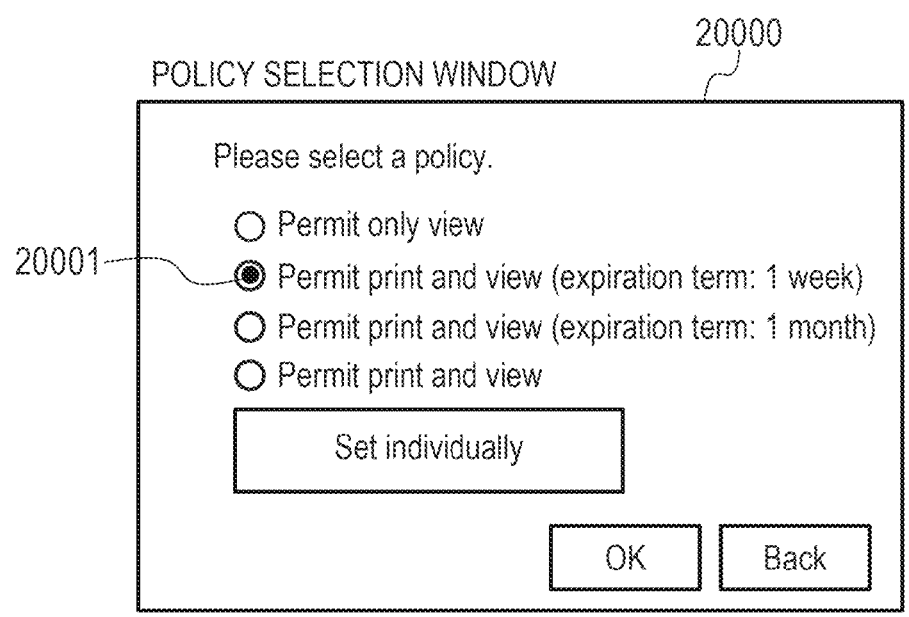
FIG. 17 is a diagram illustrating a policy selection window of a fifth embodiment.

FIG. 17 is a diagram illustrating an example of a policy selection window of the fifth embodiment, which is displayed in a state where the previously used policy is selected. For example, a case where the user belonging to the same group as the user who is currently performing a secure scan operation has selected "Print and view permission (expiration term: one week)" at the previous time will be described as an example. In this case, as illustrated in the policy selection window 20000 of FIG. 17 as an example, the policy selection window is displayed in a state where "Print and view permission (expiration term: one week)" 20001 is selected.

When another policy is selected from this state, the policy control unit 212 requests the policy server 311 that the policy name be defined as a name obtained by removing the keyword from the policy name provided with the keyword. Furthermore, the policy control unit 212 requests the policy server 311 that the policy name be defined as a name obtained by adding a keyword to the policy name of a newly selected policy. Accordingly, the policy selection window 20000 is displayed in a state where a newly selected policy is selected from the next time.

Further, although a configuration in which a mobile device identifying a user serves as the IC card has been described in each of the above embodiments, a mobile device other than an IC card may be used as long as it can uniquely identify a user and provide the same effect without being limited to the IC card. For example, a form in which a user is identified by using a mobile device such as a user's wearable device (personal device) implementing short-range wireless communication such as NFC, for example, a smart phone, a wearable watch, or the like possessed by the user may be employed.

Furthermore, in each of the above embodiments, a form in which a document provided with a policy in accordance with a secure scan is stored in a USB memory, a cloud storage, or the like has been described. As described previously, however, when a personal device such as a smartphone is used to identify a user, a document provided with a policy may be stored in a storage region of the personal device. The technology of storing such a document in a storage region of a personal device may be, for example, a technology of transferring a file through connection with Wi-Fi or Bluetooth (registered trademark) in response to touch using NFC or the like as a known technology.

Further, instead of a policy server administrator ID or a policy server administrator password, identification information on a client device such as an MFP, a scanner, or the like (for example, a serial number, a MAC address, or the like) may be used.

As set forth, an encrypted file is associated with a security setting in accordance with the policy based on the identification information, and at least a part of an operation on the file can be restricted in accordance with a security setting according to the policy. Therefore, even with an MFP or the like in an environment such as a shared office or a co-working space used by an unspecified number of users, a document provided with a security policy can be created with a simple operation without registration of a user's individual setting in the MFP or the like or the policy server. For example, with a simple operation of holding an IC card thereover, it is possible to provide a policy to a scanned document and enhance the security. Further, also when using a document provided with a policy, it is possible to easily confirm the policy only by holding an IC card thereover and perform only an authorized operation. Accordingly, a document provided with a policy can be created with a simple operation. It is therefore possible to realize an image forming apparatus that has a function of creating and operating a highly secured document provided with a policy through only a simple operation such as touch by an IC card. Note that, without being limited to touch by an IC card, a user ID and a password may be input by the user from an operation window or the like.

Note that it goes without saying that the configuration of various data described above and the contents thereof are not limited thereto and may be formed of various configurations or contents in accordance with a use or a purpose. As set forth, although illustrated for some embodiments, the present invention can take an embodiment as a system, an apparatus, a method, a program or a storage medium, or the like, for example. Specifically, the present invention may be applied to a system formed of a plurality of devices or may be applied to an apparatus formed of a single device. Further, all the configurations combining some of the embodiments described above are also included in the present invention.

According to the present invention, it is possible to provide a policy to a scanned document to enhance security with a simple operation and, also when using a document provided with a policy, confirm the policy and enable only an authorized operation with a simple operation.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-041056, filed Mar. 10, 2020, which is hereby incorporated by reference herein in its entirety.

What is claimed is:

1. A scanner comprising:
   a management unit that manages predetermined account information registered in a policy server wherein the predetermined account information is account information to be shared by a plurality of users of the scanner;

an access unit that accesses the policy server by using the predetermined account information and access information of the policy server;

an acceptance unit that accepts identification information readable from a mobile device possessed by a user;

a registration unit that registers a policy in the policy server based on the accepted identification information; and a generation unit that generates a file including data obtained by a scan and the access information of the policy server, wherein the data is encrypted by the scanner using an encryption key acquired from the policy server, wherein the registered policy indicates a security setting for the file, and wherein the predetermined account information is different from the accepted identification information.

2. The scanner according to claim 1, wherein the registration unit generates user information from the accepted identification information and registers the generated user information in the policy server in association with the policy.

3. The scanner according to claim 2, wherein the user information is associated with a group registered in the policy server, and the group is associated with the policy.

4. The scanner according to claim 1, wherein a policy corresponding to a security setting for the file is able to be selected in the scanner.

5. The scanner according to claim 4, wherein the policy is able to be selected from a plurality of policies registered in the policy server.

6. The scanner according to claim 4, wherein the policy is able to be created in the scanner.

7. The scanner according to claim 1, wherein the access information is a URL for accessing the policy server.

8. The scanner according to claim 1 further comprising an acquisition unit that acquires a decryption key from the policy server in order to decrypt the encrypted data based on the access information and the identification information readable from the mobile device.

9. The scanner according to claim 8, wherein when printing is not permitted in the policy, printing data decrypted and obtained from the file is restricted.

10. The scanner according to claim 1, wherein the mobile device is an IC card.

11. The scanner according to claim 1, wherein the mobile device is a wearable device of a user.

12. The scanner according to claim 1, wherein the predetermined account information is account information registered to the policy server by a provider that installs the scanner and provides a service.

13. The scanner according to claim 1, wherein identification information on the scanner is used as the account information.

14. The scanner according to claim 1 further comprising a printing unit.

15. A scanner control method comprising:

an access step of accessing a policy server by using predetermined account information registered in the policy server and access information of the policy server, the predetermined account information being account information to be shared by a plurality of users of the scanner;

an acceptance step of accepting identification information readable from a mobile device possessed by a user;

a registration step of registering a policy in the policy server based on the accepted identification information; and a generation step of generating a file including data obtained by a scan and the access information of the policy server, wherein the data is encrypted by the scanner using an encryption key acquired from the policy server, wherein the registered policy indicates a security setting for the file, and wherein the predetermined account information is different from the accepted identification information.

16. A non-transitory computer-readable storage medium comprising a program that causes a computer to perform the scanner control method according to claim 15.

* * * * *